United States Patent [19]

Otsuka et al.

[11] Patent Number: 4,773,057
[45] Date of Patent: Sep. 20, 1988

[54] APPARATUS FOR REPRODUCING SELECTIVELY LOADED DISCS OF DIFFERENT DIAMETERS

[75] Inventors: Minoru Otsuka; Kazuto Naganuma, both of Tokyo; Keiji Maruta, Kanagawa; Akihiro Yamada, Tokyo; Kazuyuki Takizawa, Chiba; Shigeru Miyazaki, Kanagawa; Hideki Okii; Hiroshi Orikawa, both of Saitama, all of Japan

[73] Assignee: Sony Corporation, Tokyo, Japan

[21] Appl. No.: 88,614

[22] Filed: Aug. 21, 1987

[30] Foreign Application Priority Data

Aug. 25, 1986 [JP] Japan ................................ 61-197311

[51] Int. Cl.[4] ................... G11B 17/035; G11B 19/20; G11B 17/08
[52] U.S. Cl. .................................. 369/75.2; 369/197; 369/265
[58] Field of Search ....................... 369/75.2, 265, 197, 369/198, 191, 194, 36, 37, 239, 184, 187, 188, 189

[56] References Cited

U.S. PATENT DOCUMENTS

| 3,844,571 | 10/1974 | Mensier | 369/265 |
| 4,403,317 | 9/1983 | Suzuki et al. | 369/75.2 |
| 4,574,418 | 3/1986 | Yamaguchi | 15/268 |
| 4,625,304 | 11/1986 | Kanamaru et al. | 369/77.1 |
| 4,631,716 | 12/1986 | Ikeda et al. | 369/75.2 |
| 4,701,901 | 10/1987 | Imai | 369/75.2 |

FOREIGN PATENT DOCUMENTS

| A0170957 | 2/1986 | European Pat. Off. |  |
| A0175308 | 3/1986 | European Pat. Off. |  |
| A0135969 | 4/1986 | European Pat. Off. |  |
| A0183310 | 6/1986 | European Pat. Off. |  |
| A0185140 | 6/1986 | European Pat. Off. |  |
| 195368 | 12/1982 | Japan | 369/197 |
| 227280 | 10/1986 | Japan | 369/265 |

Primary Examiner—Steven L. Stephan
Attorney, Agent, or Firm—Alvin Sinderbrand

[57] ABSTRACT

An apparatus for reproducing signals recorded on a selected one of first and second discs of different diameters, such as, a relatively large diameter video disc and a relatively small diameter compact disc, has a disc-transporting tray mounted for substantially horizontal movement between a first or operative position within a housing and a second or disc-inserting and withdrawing position in which the tray projects substantially forwardly from the housing through an opening at the front of the latter, the tray having first and second disc mounting portions dimensioned for receiving and holding the relatively large and small diameter discs, respectively, and the second or relatively small-diameter disc mounting portion being disposed at a front part of the tray and substantially contained within the confines of the first or large-diameter disc mounting portion for minimizing the required size of the tray, and hence the overall size of the apparatus. Further, access to the second or relatively small-diameter disc mounting portion of the tray for inserting or withdrawing a compact disc may be had when the tray is only partly projected from the housing, thereby to reduce the time required for loading and unloading or exchanging a compact disc.

25 Claims, 20 Drawing Sheets

APPARATUS FOR REPRODUCING SELECTIVELY LOADED DISCS OF DIFFERENT DIAMETERS

1 BACKGROUND OF THE INVENTION

1. Field of the Invention

This invention relates generally to apparatus for reproducing signals recorded on a selected one of a plurality of discs having different diameters, and more particularly is directed to improvements in disc players of the front-loading type capable of selectively reproducing at least two kinds of discs, such as, an optical video disc of relatively large diameter, hereinafter referred to as an LD, and a compact disc of relatively small diameter, hereinafter referred to as a CD.

2. Description of the Prior Art

A so-called compatible disc player has been proposed for selectively reproducing information recorded on large-diameter optical video discs or LDs and on small-diameter compact discs CDs.

In one such proposed CD/LD compatible disc player, a box-shaped casing or housing is provided with an opening at the front thereof, a disc-transporting tray is movable horizontally through the front opening for receiving either a CD or LD at the outside of the casing and then carrying the received disc to within the casing, a first disc driving mechanism extending from a chassis within the casing for rotatably driving the LD when the latter is operatively positioned within the casing, another or second disc driving mechanism mounted on the chassis for swinging movement through approximately 90° from an operative vertical position for driving a CD and a stowed position for avoiding interference with playback of an LD, and an optical pickup for reading signals recording on either a CD or an LD while moving in a radial direction relative thereto.

In the already proposed CD/LD compatible disc player, the disc-transporting tray includes a substantially rectangular plate molded of resin and having a cutout formed therein extending rearwardly from a central portion of the tray to the center of a rear part thereof to permit an optical pick-up to move along such cutout and scan an optical disc therethrough. A first carrier or relatively large diameter disc mounting portion for guiding an LD is formed on a substantially centered part of the disc-transporting tray and includes a circular recess of a diameter slightly larger than that of the LD for receiving the latter. A second carrier or relatively small diameter disc mounting portion is formed independently of the first carrier and is capable of reciprocal movement relative to the latter along the cutout. Such second carrier includes substantially rectangular slide plates bridging the opposite side edges of the cutout and is formed with a circularly recessed portion of a diameter slightly larger than that of the CD so as to readily receive the latter.

When the disc-transporting tray is extended forwardly through the opening at the front of the casing or housing, both the first and second carriers are concentrically positioned at the center of the tray. On the other hand, when the disc transporting tray is moved into the housing by means of a loading mechanism, the second carrier is simultaneously moved relative to the tray at a relatively high speed in the rearward direction so that the second carrier is quickly displaced to a predetermined CD playback position at the rearmost part of the tray within the housing. When signals recorded on an LD are to be reproduced, the disc-transporting tray is moved downwardly within the player casing by means of the loading mechanism, and the LD received by the first carrier is then held between a turntable driven by a spindle motor of the respective disc driving mechanism and a chuck provided for the LD so as to be rotated at a relatively high speed while signals recorded on the LD are read by the optical pickup which is moved relative to the LD in a radial direction of the latter. During such reading or playback of the signals recorded on an LD, the spindle motor of the CD drive mechanism is angularly displaced through 90° from its operative vertical position so as to avoid interference with the movements of the optical pickup radially in respect to the LD.

On the other hand, when signals recorded on a CD are to be reproduced, the disc transporting tray is again moved downwardly after being inserted horizontally into the player casing, and the CD received by the second carrier is gripped between a CD chuck and a turntable on the spindle motor of the CD drive mechanism which, at this time, extends vertically, so that the CD is rotatably driven while the signals recorded on the CD are read by means of the optical pickup during movement of the latter in the radial direction of the CD.

However, since the previously proposed CD/LD compatible disc player has the disc transporting tray thereof provided with independent LD and CD carriers, with the CD carrier being slidable relative to the LD carrier above the latter along a path extending rearwardly from the center of the LD carrier, the depth of the disc player casing cannot be minimized. Further, the thickness or height of the disc transporting tray cannot be desirably reduced while maintaining a required rigidity of the structure. Moreover, in view of the need to effect movement of the CD carrier relative to the LD carrier, an additional driving mechanism is required for effecting such movements so that the number of parts employed in the disc player and the complexity of its construction are increased with the result that the cost of the apparatus is undesirably raised.

Finally, for ejecting a CD at the completion of the playback of the recorded signals thereon, the disc-transporting tray is extended forwardly through the opening of the disc player casing and at the same time, the LD carrier and the CD carrier are moved relative to each other so as to be finally disposed concentrically at the central portion of the tray. Thus, in order to fully expose the CD carrier for permitting convenient removal of the CD therefrom, the disc-transporting tray has to be in its fully extended position relative to the player casing. The movement of disc-transporting tray to and from its fully extended position is relatively time consuming with the result that an undesirably long period of time is required for either ejecting a CD at the completion of the playback thereof, or for exchanging one CD or LD for another.

OBJECTS AND SUMMARY OF THE INVENTION

Accordingly, it is an object of this invention to provide a compatible disc player which avoids the above described disadvantages of the previously proposed apparatus for selectively reproducing signals recorded on LDs and CDs.

More specifically, it is an object of this invention to provide a compatible disc player which is relatively simple in construction, and hence capable of relatively inexpensive production.

Another object is to provide a compatible disc player, as aforesaid, which is susceptible of being substantially reduced in size so as to permit the selective playback of CDs and LDs in an apparatus of relatively small dimensions.

Still another object of the invention is to provide a compatible disc player, as aforesaid, which is capable of smoothly loading and ejecting a CD or LD, and which requires a reduced time for such loading and ejecting operations.

In accordance with an aspect of this invention, an apparatus for reproducing signals recorded on a selected one of first and second discs having relatively larger and smaller diameters, respectively, comprises: a housing having an opening at the front thereof; tray means mounted for horizontal movement in respect to the housing between a first position within the housing and a second position in which the tray means projects substantially forwardly from the housing through the opening, such tray means having first and second disc mounting portions dimensioned for receiving and holding the first and second discs, respectively, the first disc mounting portion being substantially fully exposed at the outside of the housing in the second position of the tray means for easy access of one of the first or larger diameter discs to and from the first disc mounting portion, and the second disc mounting portion having its center positioned at a front part of the tray means so as to be substantially fully exposed at the outside of the housing at a position of the tray means intermediate the first and second positions for easy access of one of the second or smaller diameter discs to and from the second disc mounting portion; tray driving mean for moving the tray means between the first and second positions thereof; disc driving means for rotating a disc in one of the first and second disc mounting portions with the tray means in the first position thereof; and playback means for reproducing signals from the rotated disc located in one of the disc mounting portions.

In accordance with another aspect of this invention, an apparatus for reproducing signals on a disc comprises: a housing having an opening at the front thereof; tray means having a holder for receiving the disc; tray carrier means supporting the tray means for sliding in the horizontal direction through the opening between a disc-receiving and withdrawing position substantially outside of the housing and an operative position within the housing; tray drive means for moving the tray carrier means and thereby displacing the tray means between the disc-receiving and withdrawing position and the operative position; pickup means for reproducing signals from a disc received in the holder with the tray means in its operative position and being moved relative to the disc in a radial direction of the latter; servo means for tilting the pickup means to compensate for warping of the disc; first motor means coupled with a turntable for rotating the latter adjacent to the operative position; chucking means for chucking the disc in the operative position; tray depressing means for moving the chucking means and the tray means in the downward direction relative to the turntable for engaging the disc in the operative position with the turntable so as to be rotated thereby; control means for controlling the tray drive means, the tray depressing means and the servo means sequentially; and second motor means for driving the control means.

In accordance with still another aspect of the invention, an apparatus for reproducing signals recorded on a selected one of first and second discs having relatively larger and smaller diameters, respectively, comprises: tray means having first and second disc mounting portions dimensioned for receiving and holding the first and second discs respectively; tray driving means for moving the tray means between a first position, at which signals recorded on either of the first and second discs can be reproduced, and a second position, at which one of the first and second discs can be inserted in, and withdrawn from a respective one of the first and second disc mounting portions; and means for minimizing the time required for the tray means to receive a selected one of the first and second discs at the second position and then to be moved by the tray driving means to the first position. For example, in respect to the foregoing, the second disc mounting portion of the tray means preferrably has its center displaced from the center of the first disc mounting portion in the direction of the movement of the tray means from the first or play position to the second position at which the first disc mounting portion is completely in a loading space for the insertion or withdrawal of one of the first discs into or from the first disc mounting portion, and the means for minimizing the loading time controls the tray driving means so as to move the tray means to a position intermediate the first and second positions and at which the second disc mounting portion is in the loading space when it is desired to insert or remove one of the second discs.

The above, and other objects, features and advantages of the invention, will be apparent in the following detailed description of a preferred embodiment of the invention which is to be read in connection with the accompanying drawings in which corresponding elements and parts are identified by the same reference numerals in the several views.

DETAILED DESCRIPTION OF A PREFERRED EMBODIMENT

Figure 1:
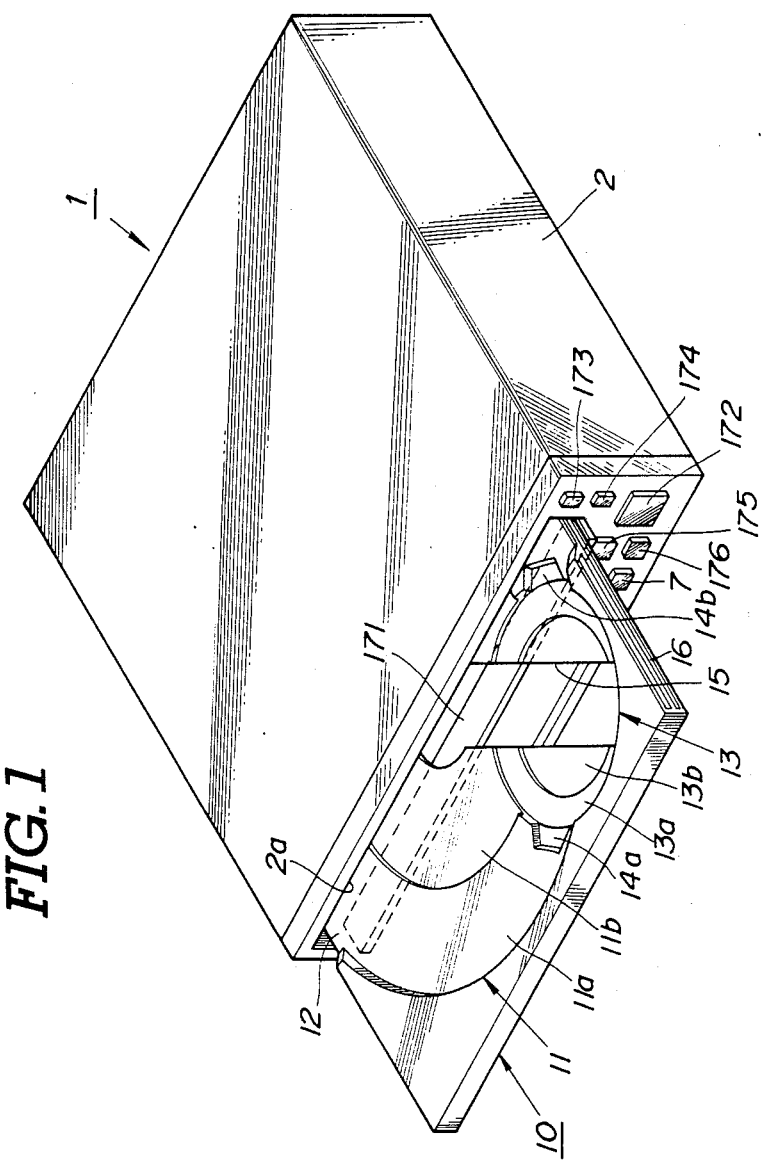
FIG. 1 is a perspective view of a compatible disc player according to an embodiment of the present invention, and which is shown with its disc-transporting tray extending forwardly from the player casing in a position for the insertion or withdrawal of a CD.
Figure 17:
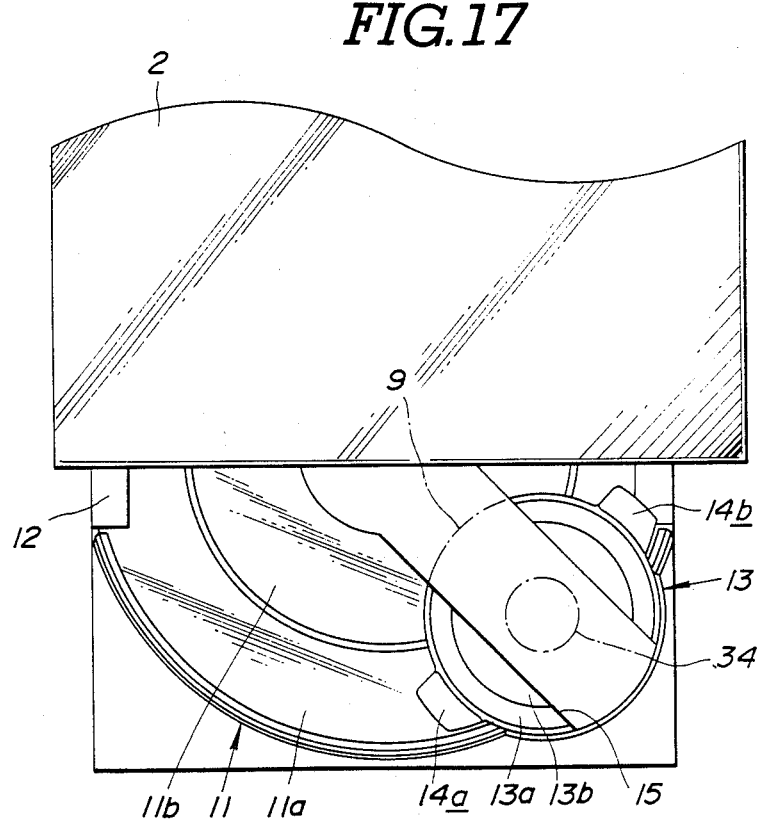
FIG. 17 is a plan view similar to that of FIG. 15, but showing the compatible disc player with its disc-transporting tray positioned for receiving or ejecting a CD.

Referring initially to FIG. 1, it will be seen that a compatible disc player 1 according to an embodiment of this invention generally comprises a relatively wide and low box-like casing 2 having an elongated opening 2a extending across a front panel of the casing, and a disc-transporting tray 10 which is movable horizontally through opening 2a between extended positions in front of the casing 2 (FIGS. 1 and 17 and FIG. 15) for receiving or giving up a relatively small diameter CD, or for receiving or giving up a relatively large diameter LD, respectively, and an operative position within casing 2, and at which the signals recorded on a CD or LD can be reproduced. The compatible disc player 1 is further shown to generally comprise a chassis 3 disposed at the bottom of casing 2, and an LD driving mechanism 20 and a CD driving mechanism 30 (FIG. 4) suitably mounted on the chassis 3 and being selectively operative to effect rotation of an LD or a CD, respectively, on tray 10 in its operative or playback position. A drive positioning mechanism 40 is provided on chassis 3 and is operative to bodily move CD driving mechanism 30 relative to the chassis 3 in directions toward and away from the LD driving mechanism 20. Thus, when the signals on a LD are to be reproduced, the CD drive mechanism 30 is positioned relatively far from the LD drive mechanism 20, for example, as shown on FIG. 4 and in full lines on FIG. 10. On the other hand, when the signals on a CD are to be reproduced, the CD drive positioning mechanism 40 is operated to move the CD drive mechanism 30 in the direction toward the LD drive mechanism 20, for example, to the position indicated in broken lines at 30' on FIG. 10.

Figure 3:
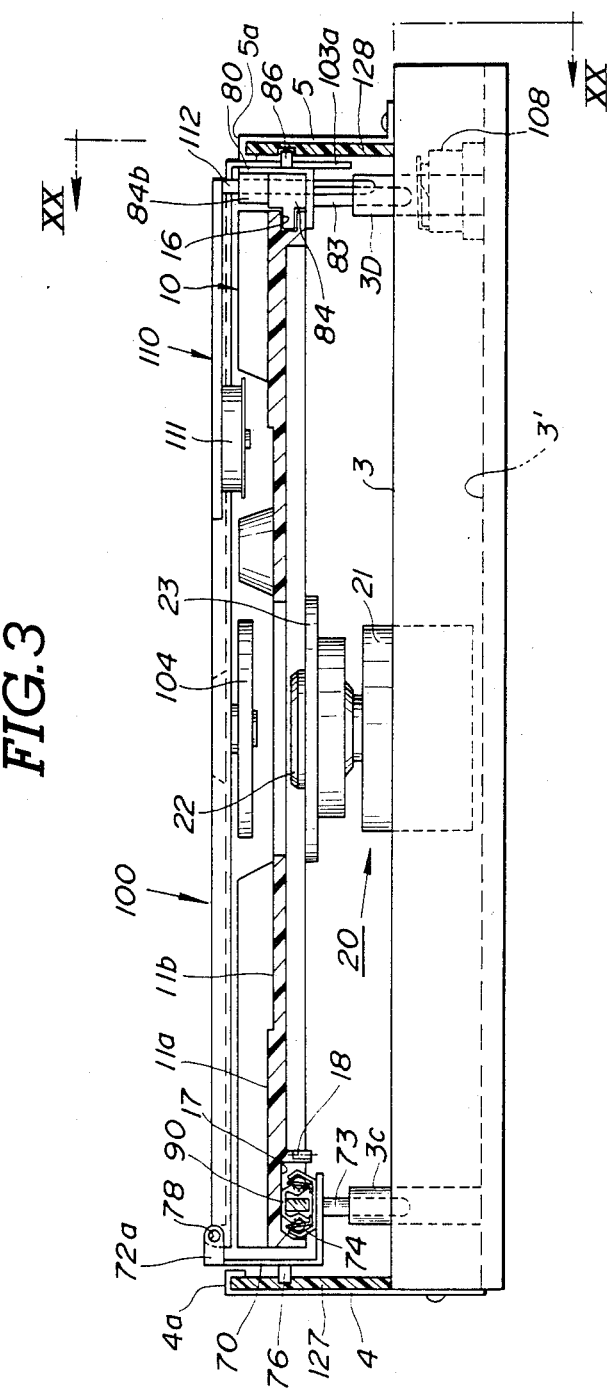
FIG. 3 is a front elevational view shown partly in section as viewed along the line III—III on FIG. 4, and illustrating certain of the internal structures of the disc player of FIG. 1.
Figure 4:
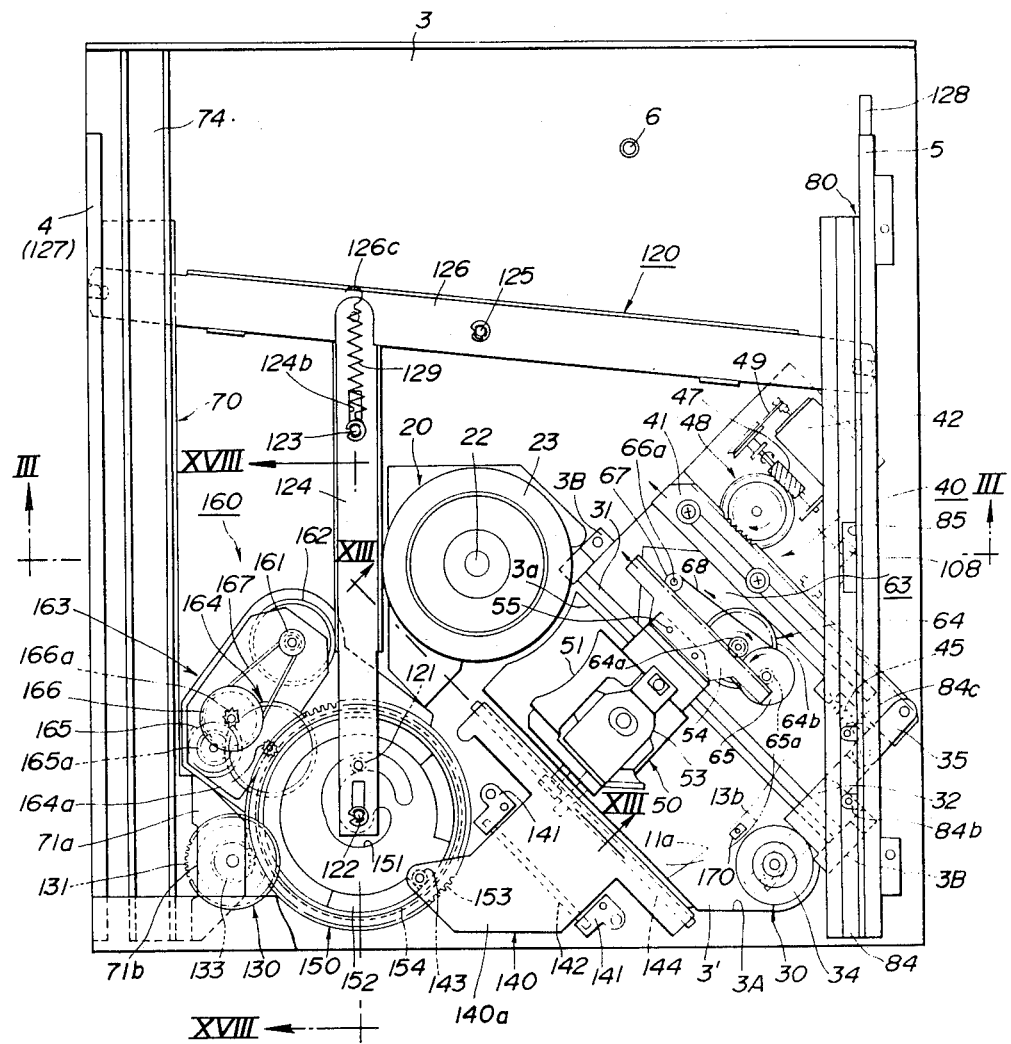
FIG. 4 is a top plan view of the disc player showing the internal structures thereof during a skew servo operation.

The compatible disc player 1 in accordance with the invention is further shown on FIG. 4 to comprise an optical pickup assembly 50 movable between drive mechanisms 20 and 30 along a diagonal line extending through the axis of rotation of such drive mechanisms, and being incapable of reproducing or reading information from either an LD rotated by drive mechanism 20 or a CD rotated by drive mechanism 30. Tray carriers 70 and 80 are movable vertically in respect to side plates 4 and 5, respectively, extending upwardly from the opposite sides of chassis 3 and cooperate with a tray transporter 90 disposed slidably on at least one of the tray carriers 70 and 80 for permitting horizontal movements of tray 10 mounted thereon through opening 2a between the external or extended positions of the tray for receiving or giving up an LD or a CD thereon and a an operative or playback position of the tray 10 completely within casing 2, and in which the tray 10 can be moved downwardly or depressed for engagement of the LD or CD thereon with the LD drive mechanism 20 or the CD drive mechanism 30. An LD chuck assembly 100 and a CD chuck assembly 110 (FIGS. 3 and 6) are mounted to be movable vertically with the tray carriers 70 and 80 so that, when the tray 10 is lowered within the casing 2 for bringing the LD or CD on the tray into engagement with the drive mechanism 20 or 30, the respective chuck assembly 100 or 110 is moved downwardly for securing or chucking the LD or CD on the respective drive mechanism 20 or 30. A carrier drive mechanism 120 is provided for effecting the vertical movements of the tray carriers 70 and 80, and hence of the disc-transporting tray 10, and a differential gear member 130 is provided for driving the tray 10 horizontally in respect to tray carriers 70 and 80. A skew servo device 140 is associated with the optical pickup 50 for adjusting the angle of the latter so as to compensate for curvature or warping of an LD or CD which is being rotated by drive mechanism 20 or 30, and a control cam disc 150 is provided for controlling the carrier driving mechanism 120, the differential gear member 130 and the skew servo device 140.

The above generally described major components of the compatible disc player 1 according to an embodiment of this invention will now be individually described in greater detail.

Figure 2:
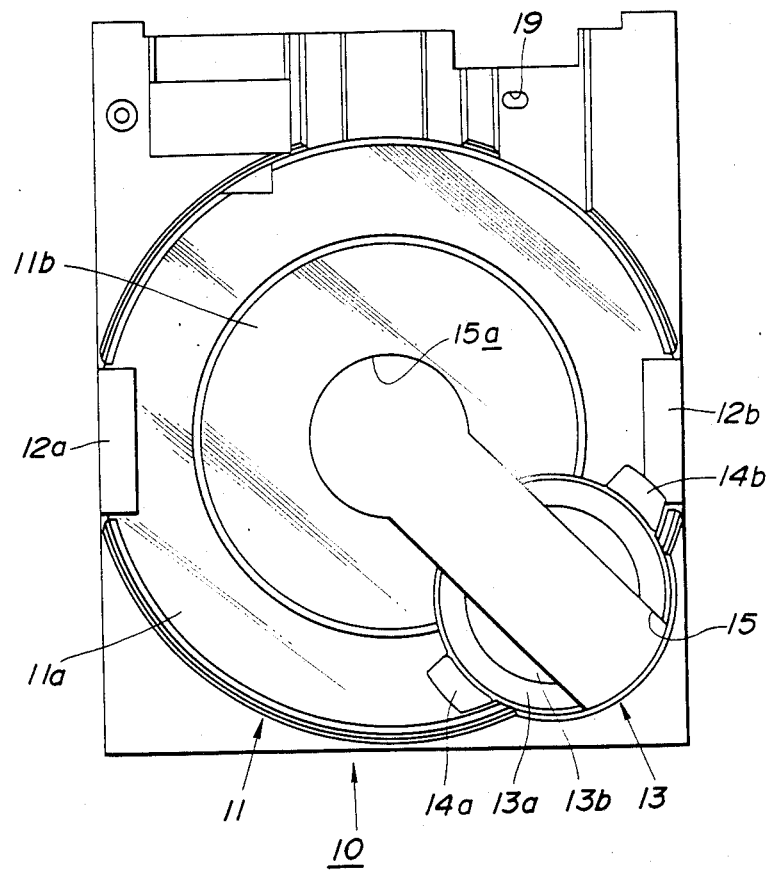
FIG. 2 is a plan view of the disc-transporting tray included in the player of FIG. 1.

As shown particularly on FIGS. 2 and 3, the disc-transporting tray 10 is preferably formed or molded of a synthetic resin so as to have a generally rectangular, plate-like shape providing, at its upper surface, a relatively large diameter disc or LD mounting portion 11 in the form of a circular recess 11a that is laterally centered in respect to the tray and extends to the opposite side edges of the latter. The recess 11a of disc mounting portion 11 has a diameter slightly larger than the diameter (30 cm) of a large-diameter LD. Preferably, a middle-diameter circular recess 11b is formed concentrically within recess 11a and has a diameter slightly larger than the diameter (20 cm) of a middle-diameter LD. The recess 11b is deeper, or stepped downwardly from the recess 11a, as is apparent on FIG. 1. Cutouts 12 are formed in the opposite sides of the relatively large diameter mounting portion 11 and extend into recess 11a for facilitating the removal from the latter of a large-diameter disc or LD 8, indicated in broken lines on FIG. 15.

A relatively small diameter disc mounting portion 13 is formed at the forward part of tray 10, and preferably adjacent one of the front corners of the tray, for example, in the right front corner portion of the tray, as viewed on FIG. 2. Furthermore, such small diameter disc mounting portion 13 is substantially contained within the confines of the large diameter disc mounting portion 11 so as to minimize the overall size of the tray 10 required for accommodating the two disc mounting portions 11 and 13. The relatively small diameter disc mounting portion 13 is shown to be formed with a circular recess 13a having a diameter slightly larger than the diameter (12 cm) of a smaller-diameter CD. Further, a still smaller circular ( recess 13b is formed concentrically within recess 13a and is stepped downwardly from the latter, with the circular recess 13b having a diameter only slighly larger the diameter (8 cm) of a smallest-diameter CD. Diametrically opposed recesses 14a and 14b extend from the outer perimeter of recess 13a into the adjacent floor or bottom surface of the circular recess 11a and into the adjacent cutout 12b, respectively. Such recesses 14a and 14b facilitate the removal from recess 13a of a smaller-diameter CD indicated in broken lines at 9 on FIG. 17.

The tray 10 is further shown on FIG. 2 to be formed with a diagonally extending elongated cutout 15 having a circular portion 15a at one end concentric with disc mounting portion 11. The longitudinal axis of elongated cutout 15 extends from the center of disc mounting portion 11 through the center of the relatively small disc mounting portion 13. When the disc-transporting tray 10 is fully contained within casing 2, the axis or center of the LD driving mechanism 20 is concentric with the circular end portion 15a of the cutout, and the CD driving mechanism 30 and optical pickup assembly 50 are moveable rectilinearly along the elongated cutout 15.

Figure 16:
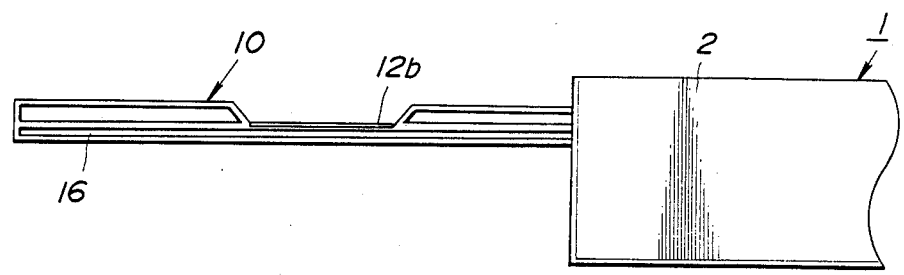
FIG. 16 is a side elevational view of the compatible disc player shown in the condition illustrated on FIG. 15.

As shown in FIGS. 3 and 16, an elongated, laterally outward opening groove 16 is formed along the right hand side of tray 10 for slidably guiding the latter in its horizontal movements in respect to tray carrier 80. Adjacent the opposite or left side of the tray 10, the latter is formed with a downwardly opening, elongated recess 17 (FIG. 3) for housing the tray transporter 90. A gear rack 18 is formed along the inner side surface of a depending rib defining the inner margin of recess 17 and is engageable by differential gear member 130, as hereinafter further described, for effecting horizontal movements of the tray 10 relative to carriers to 70 and 80. A positioning hole 19 is formed in the back portion of disc-transporting tray 10 (FIG. 2) and is engageable by a positioning pin 6 (extending upwardly from the chassis (FIGS. 4, 20 and 21) for precisely locating tray 10 relative to chassis 3, and hence relative to the other components mounted on the chassis, when the tray is moved downwardly or depressed while contained within casing 2, as hereinafter described.

As shown on FIGS. 3 and 4, the LD drive mechanism 20 includes a motor 21 suitably fixed on chassis 3 with the motor axis or spindle 22 extending vertically upward and being concentric with the relatively large diameter disc mounting portion 11 of the tray 10 when the latter is in its playback position fully contained within casing 2. A turntable 23 is secured on the upper end of the spindle 22 and is engageable from below through the circular end portion 15a of cutout 15 with an LD in the disc mounting portion 11 when the tray 10 carrying such LD is moved downwardly to the mentioned playback position.

Referring now to FIGS. 4 and 9-11, it will be seen that the CD drive mechanism 30 includes a support block 32 slidable along a guide rod 31 which has its opposite ends secured in brackets 3B directed upwardly from chassis 3. As shown particularly on FIG. 4, the guide rod 31 extends substantially along an edge 3a at the back of a diagonally extending elongated opening 3A formed in the chassis 3 so as to substantially correspond to the diagonal cutout 15 in tray 10 when the latter is positioned in its playback position. The CD drive mechanism 30 further includes a motor 33 depending from an arm 32a (FIG. 9) that extends integrally from block 32 over elongated opening 3A, and a turntable 34 fixed on the vertically directed spindle or shaft 33a of the motor 33 so as to be engageable from below through cutout 15 with a CD 9 in disc mounting portion 13 of the tray 10 when the latter is lowered in its playback position and the CD drive mechanism is disposed in its operative position indicated in broken lines at 30' on FIG. 10. A substantially T-shaped link 35 (FIG. 11) is pivotably connected at one end of its head portion, as at 35a, with a lug 32b projecting from block 32 in the direction away from opening 3A, and the opposite end of the head portion of link 35 is pivotably connected as at 35c, with one end of an elongated slide 41 included in the positioning mechanism 40 which is hereinafter described in detail. A guide rail 36 (FIGS. 9 and 11) is fixed on chassis 3 along that part of the edge portion 3a 32 when changing the position of the CD drive mechanism 30. A hook-shaped end portion 37a of an adjustable stop member 37 mounted on the chassis 3 projects above an end portion of the rail 36 and is engageable by an axle 38 projecting downwardly from block 32. Such axle 38 carries a rotatable roller 39 which engages in rail 36 for maintaining motor 33 with its axis extending substantially vertical during movement between the stowed and operative positions shown in full lines and in broken lines, respectively, on FIG. 10. Further, the engagement of the hooked end portion 37a with axle 38 precisely defines the operative position of the CD drive mechanism 30. As shown particularly on FIG. 10, a portion of block 32 extending in the direction toward tray carrier 80 is formed with an inclined upper surface 32c for ensuring that the CD chuck assembly 110 will not interfere with the playback of an LD, as hereinafter described in detail.

Figure 9:
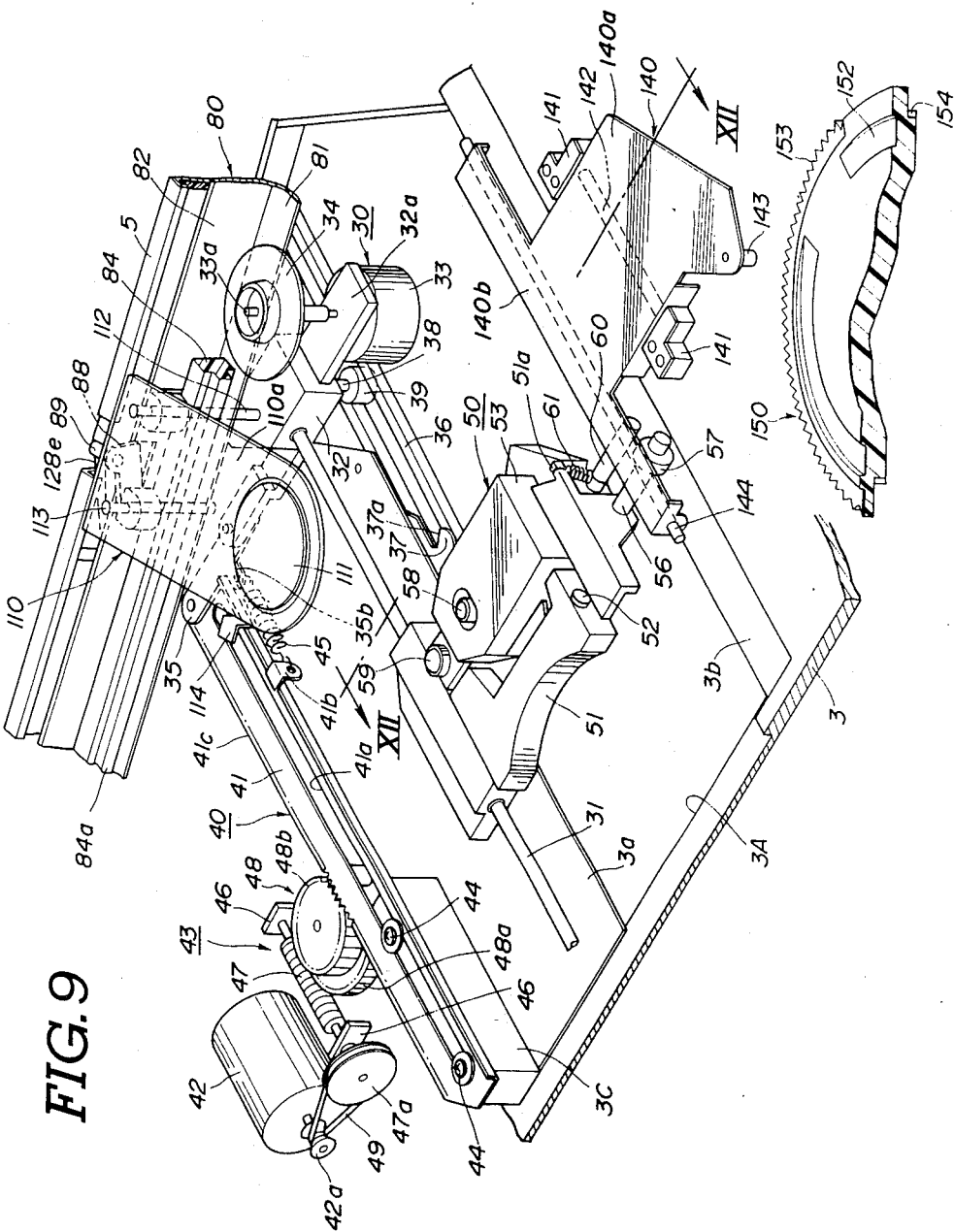
FIG. 9 is a perspective view of a CD driving mechanism and associated structures included in the compatible disc player of FIG. 1.
Figure 11:
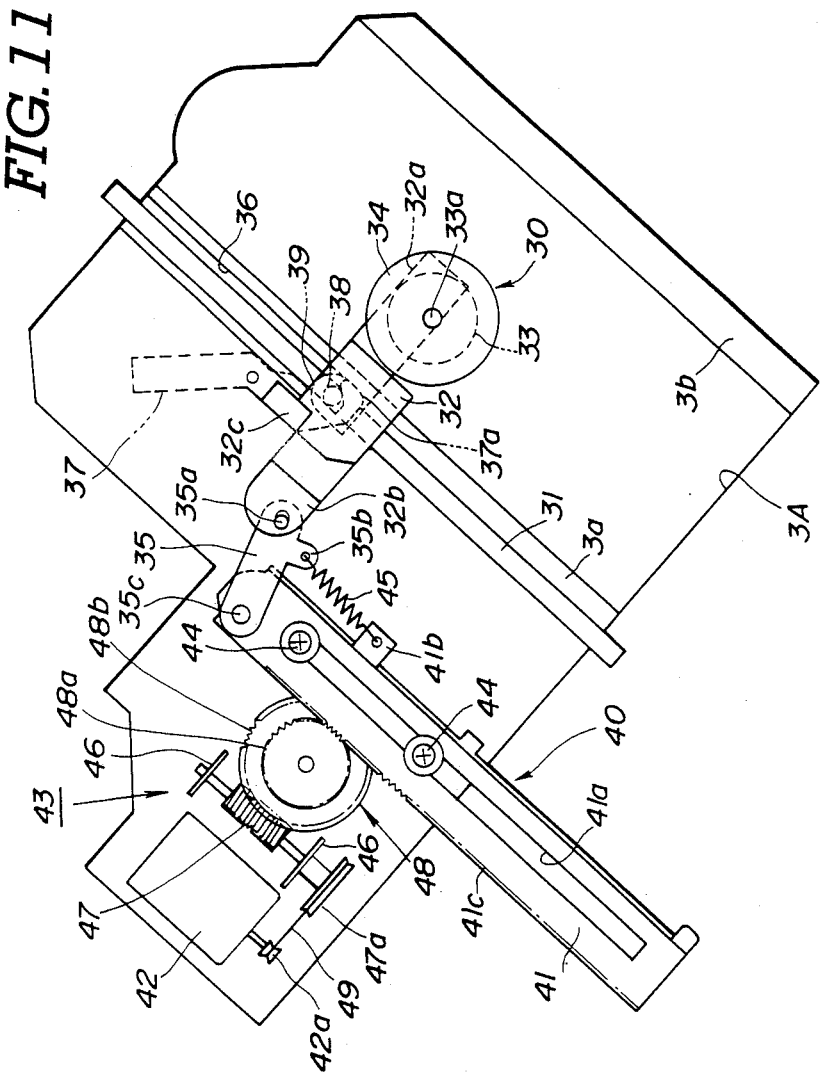
FIG. 11 is a plan view of the CD driving mechanism and of an associated mechanism for moving the CD driving mechanism between an operative position and a stowed position.

As shown in FIGS. 4, 9 and 11, the mechanism 40 for positioning the CD drive mechanism 30 along guide rod 31 includes the previously mentioned elongated slide 41 which has a slot 41a extending therealong and slidably receiving screws 44 by which the slide member 41 is mounted for longitudinal movement on a mounting block 3C (FIG. 9) secured to chassis 3 and extending parallel to guide rod 31. A motor 42 which is suitably mounted on the chassis drives the slide member 41 through a speed reducing device 43. A coil spring 45 is connected, at one end, to the step 35b of T-shaped link 35 and, at its other end, to a tab 41b extending from slide 41. When slide 41 is in the position shown on FIG. 11 for moving block 32 to the end of rail 36 where axle 38 engages adjustable stop 37, spring 45 is loaded or tensioned to ensure continuous contact of axle 38 with stop 37, thereby to precisely determine the operative position of the CD drive mechanism 30 during playback or reproducing of signals on a CD. A gear rack 41c is formed along the side edge of slide 41 facing away from guide rod 31 and the speed reduction device 43 transmits the driving force of the motor 42 to the gear rack 41c. More specifically, the speed reduction device 43 is shown to include a pair of brackets 46 directed upwardly from the chassis 3, a worm 47 rotatably supported between the brackets 46, and a pinion member 48 rotatably mounted on the chassis 3 and including a relatively large diameter worm gear 48b meshing with the worm 47 and a relatively small-diameter gear 48a meshing with the rack 41c on slide 41. A belt 49 extends around a pulley 42a fixed on the shaft of the motor 42 and a pulley 47a secured to worm 47 at one end of the latter. It will be appreciated that motor 42 is suitably controlled so as to displace CD drive mechanism 30 between its inoperative or stowed position (FIG. 9) and its operative position (FIG. 11).

Figure 12:
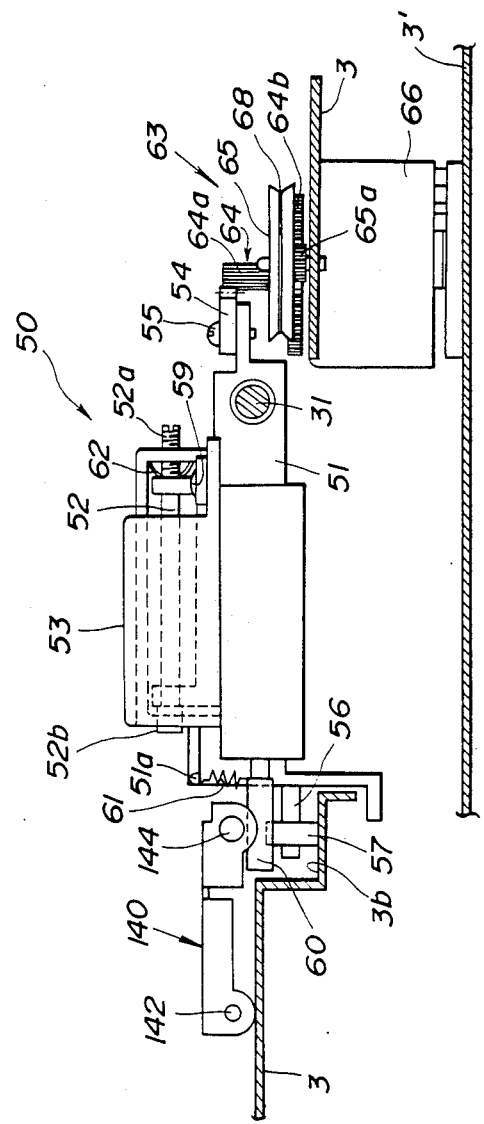
FIG. 12 is an elevational view of an optical pickup assembly included in the compatible disc player, as viewed in the direction of the arrows XII—XII on FIG. 9.
Figure 13:
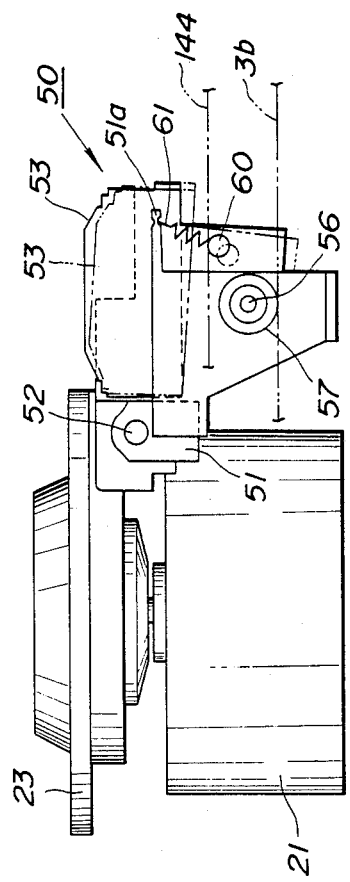
FIG. 13 is a front elevational view of the optical pickup assembly shown in its innermost position adjacent an LD drive mechanism, and as viewed in the direction of the arrows XIII—XIII on FIG. 4.
Figure 14:
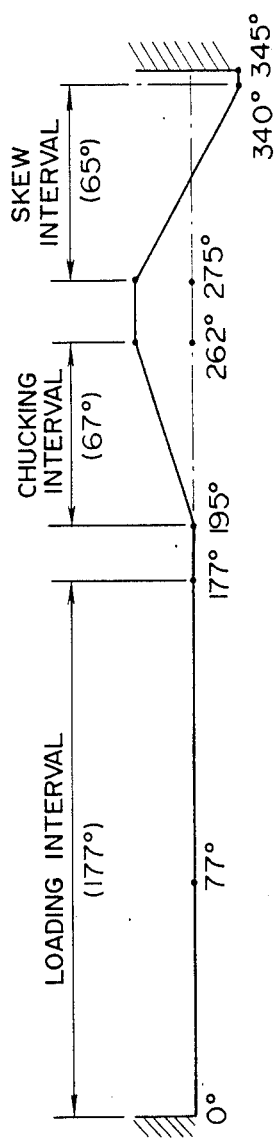
FIG. 14 is a timing chart to which reference will be made in describing the operation of the control cam disc of FIG. 7.

As shown particularly on FIGS. 9, 12 and 13, the optical pickup assembly 50 includes a substantially C-shaped support block 51 which is slidably supported, at one end portion thereof, on guide rod 31. An axle 56 projects from the end portion of block 51 remote from guide rod 31 and carries a rotatable roller 57 which rolls along the upper surface of the edge portion 3b of chassis 3 at the side of opening 3A remote from rod 31. Thus, support block 51 horizontally spans the elongated opening 3A between the LD drive mechanism 20 and the CD drive mechanism 30 (FIG. 4). A pickup casing 53 is embraced by the C-shaped block 51 and is mounted in respect to the latter for pivotal upward and downward movements about a support shaft or axle 52 carried by block 51 and extending at right angles to guide rod 31. A gear rack 54 (FIGS. 4 and 12) is secured, as by the screws 55, to the end portion of block 51 slidable on guide rod 31, and such gear rack 54 extends parallel to guide rod 31. A feed mechanism 63 for driving the optical pickup assembly 50 along guide rod 31 between the LD drive mechanism 20 and the CD drive mechanism 30 is shown to include a gear member 64 rotatably mounted on the chassis 3 and having a small diameter pinion 64a at its upper end meshing with rack 54 and an integral relatively large diameter gear 64b at its lower end meshing with a relatively small diameter gear 65a coupled with a relatively large diameter pulley 65 which is also rotatably mounted on the chassis 3. A motor 66 is mounted at the underside of the chassis 3 and has its shaft 66a extending upwardly through the chassis and fixed to a relatively small diameter driving pulley 67 to drive a belt 68 which extends around the pulley 65.

The optical pick-up assembly 50 is further shown to generally include an objective lens 58 forming part of a known optical system for an optical disc player and by which a laser been is directed against the LD or CD disc for reflection from the latter, whereupon the reflected beam modulated by the information signal recorded on the disc is collected by the objective lens 58 and applied to a photo-detector device for conversion to a corresponding electrical signal. The optical pickup assembly 50 is also shown to include a skew lens 59 forming part of a known skew detecting device, for example, as disclosed in published Japanese patent application 58-140,138, or in U.S. patent application Ser. No. 06/910,522, filed Sept. 23, 1986, and having a common Assignee herewith. Such skew detecting device is effective to detect curvature or warping of the surface of the disc by which such disc surface deviates from a perpendicular to the axis of the laser beam directed against the disc by objective lens 58. In the absence of correction, skewing resulting from warping of the disc can cause the laser beam spot on the disc to be widened in the direction across the successive tracks in which the signals are recorded with the result that there is cross-talk during playback. In the compatible disc player 1 according the present invention, the foregoing is avoided by angularly displacing casing 53 about axle 52 relative to support block 51 in response to skew errors sensed by the skew detecting device including lens 59. In order to effect such angular displacements of casing 53 about axle 52, a pin 60 projects from casing 53 at the side of the latter remote from guide rod 31, and a tension spring 61 is connected between pin 60 and a finger 51a extending thereabove from the adjacent the end portion of block 51. It will be noted that tension spring 61 urges casing 53 to swing upwardly about axle 52, and the extent of such upward swinging of casing 53 is variably controlled, as hereinafter described in detail, by the skew servo device 140 in response to the detected skew errors.

As shown particularly on FIG. 12, a spring washer 62 through which axle 52 extends is interposed between portions of block 51 and pickup casing 53 for urging the latter along axle 52 in the direction toward a head 52b at the end of axle 52 extending in the same direction as pin 60. Further, the end portion of axle 52 remote from head 52b is threaded, as at 52a, and such threaded end portion 52a of axle 52 is in threaded engagement with a hole in block 51 receiving the same. Therefore, rotational adjustment of axle 52 is effective to axially displace such axle relative to block 51 against the force of spring washer 62 so as to precisely adjust the position of the pickup assembly 50 in the direction perpendicular to guide rod 31, that is, in the direction across elongated opening 3A.

Figure 5:
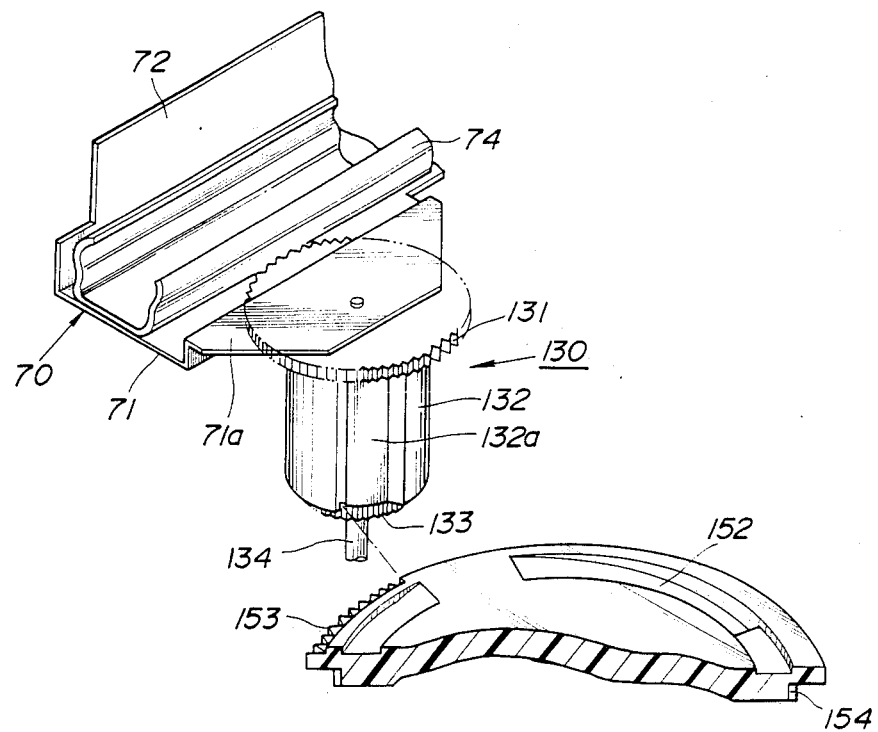
FIG. 5 is a fragmentary, exploding perspective view showing a portion of a control cam disc and a differential gear member through which a disc-transporting tray of the player is driven.
Figure 6:
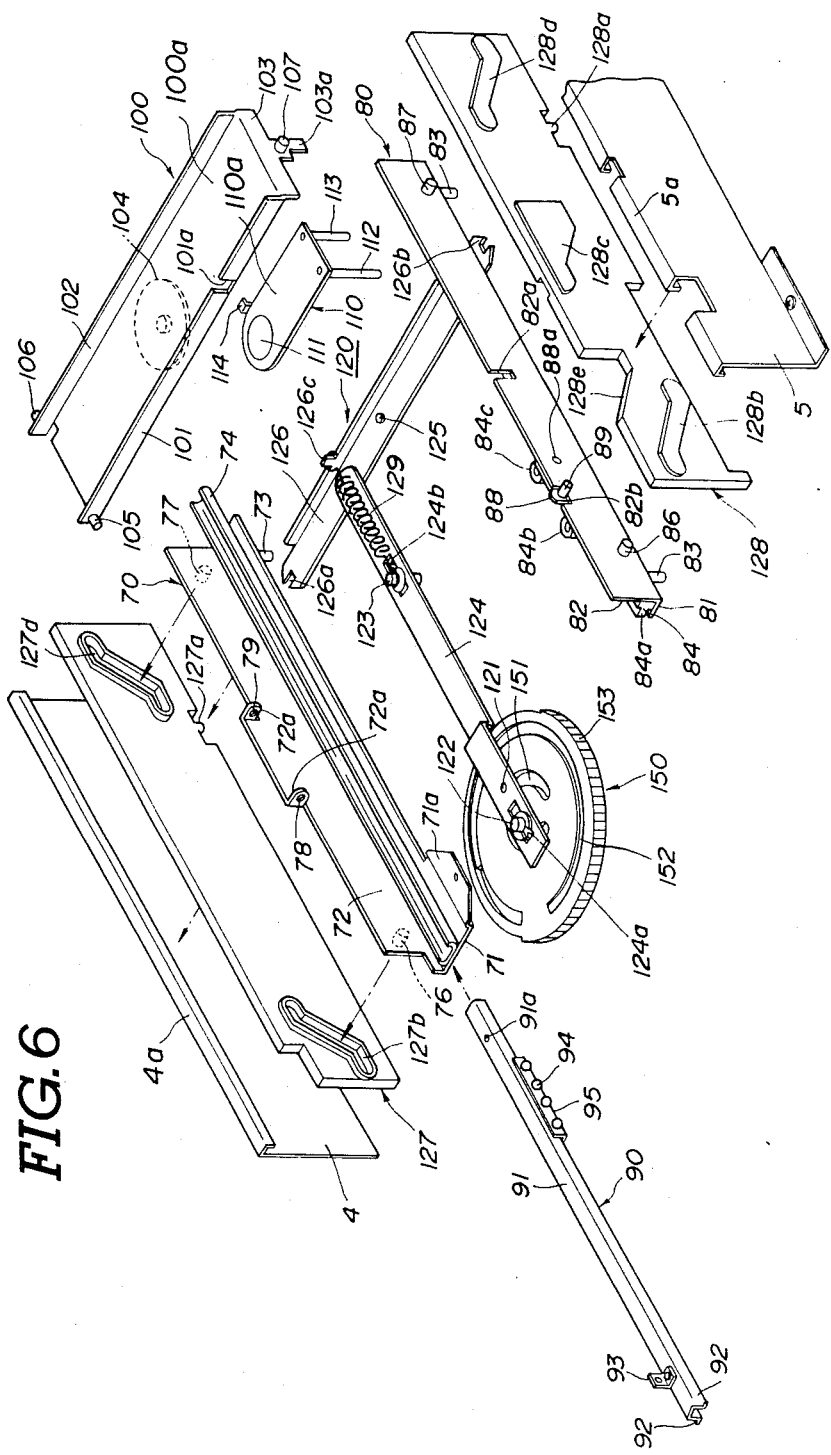
FIG. 6 is an exploded perspective view of the internal structures of the disc player shown in FIG. 4.

Referring now to FIGS. 4, 5 and 6, it will be seen that the tray carrier 70 is a metal angle member substantially L-shaped cross section and includes a bottom flange 71 and a vertically directed flange 72 extending along the outer margin of flange 71. Guide pins 73 depend from front and rear portions of bottom flange 71 and are slidably received in vertical bushings 3C (FIG. 3) directed upwardly from the respective side portion of the chassis 3. Thus, tray carrier 70 is mounted by pins 73 for vertical movements relative to the chassis 3 while being held against displacements in the longitudinal direction of tray carrier 70. An elongated channel 74 of substantially U-shaped cross section is suitably secured on the upper surface of bottom flange 71, and a projection 71a is offset upwardly from the front portion of bottom flange 71 and extends inwardly from the latter (FIG. 5) for rotatably supporting the differential gear member 130 (FIG. 5). Two cam follower pins 76 and 77 extend outwardly from the opposite end portions of vertical flange 72 (FIG. 6). Further, the central portion of vertical flange 72 has a raised upper edge portion 72b with lugs 72a being directed inwardly from the opposite ends of such raised upper edge portions 72b and having respective holes 78 and 79.

As shown on FIGS. 4, 6, 9 and 20, the tray carrier 80 also includes an elongated angle member of substantially L-shaped cross section having a bottom flange 81 and a vertical flange 82 extending upwardly along the outer margin of bottom flange 81. Guide pins 83 project vertically downward from the front and rear portions of bottom flange 81 and are slidably received within vertical bushings 3D extending vertically from the chassis 3. An elongated guide element 84 of a synthetic resin is suitably fixed along the corner between flanges 81 and 82, and an inwardly projecting rib 84a is provided along the inner side of guide element 84 approximately midway between the top and bottom of the latter so as to be slidably received in the guide groove 16 extending along the adjacent side of tray 10. A pair of spaced apart cylindrical bushings 84b and 84c are formed integrally with, and extend upwardly from the front portion of the guide element 84 (FIGS. 4 and 6). A rectangular hole 85 (FIG. 4) extends through guide element 84 and the underlying bottom flange 81 adjacent the vertical flange 82 near the middle portion of tray carrier 80, for a purpose to be hereinafter described.

Cam follower pins 86 and 87 extend outwardly from the opposite end portions of vertical flange 82, and such vertical flange 82 is further formed with cutouts 82a and 82b in its upper edge portion adjacent the middle of tray carrier 80 and adjacent the bushings 84b and 84c, respectively. An adjustment lever 88 (FIGS. 6, 20 and 21) is pivoted as at 88a, on vertical flange 82 for swinging movement in a plane parallel to such vertical flange, and a cam follower pin 89 extends outwardly from the end of lever 88 through cutout 82b, for engagement with a cam surface, as hereinafter described in detail.

As shown particularly on FIG. 6, the tray transporter 90 is substantially in the form of an elongated metal rail of approximately inverted U-shaped cross section so as to have a substantially flat top wall 91 and side walls 92 depending from the opposite margins of top wall 91. An L-shaped bracket 93 is fixed on and extends upwardly from the front end portion of the top wall 91, and a hole 91a is formed in the rear end portion of top wall 91. The disc-transporting tray 10 is secured adjacent its lefthand side, as viewed from the front, to bracket 93 and hole 91a of the transporter 90 by means of suitable screws (not shown). A substantially U-shaped ball-bearing holder 95 embraces transporter rail 90 and positions ball-bearings 94 between side walls 92 of the tray transporter 90 and the inner wall sources of channel 74 so that substantially friction-free, smooth movement of transporter 90, and of the left-hand side of the tray 10 mounted thereon, is permitted in respect to carrier 70.

As shown on FIGS. 3 and 6, the LD chuck assembly 100 includes a substantially rectangular metal plate 100a which is elongated in the lateral direction so as to extend between tray carriers 70 and 80 and which has upwardly directed flanges 101 and 102 formed along its front and rear longitudinal edges. Pivot pins 105 and 106 are directed outwardly from flanges 101 and 102 at the ends of the latter adjacent tray carrier 70 and are received in holes 78 and 79 of lugs 72a for pivotally mounted the adjacent end of rectangular plate 100a on carrier 70. The opposite end of rectangular plate 100a, that is, the end adjacent carrier 80, is formed with a depending flange 103 from which a cam follower pin 107 is directed outwardly to extend through notch 82a in the vertical flange 82 of carrier 80 for engagement with a cam surface which determines the vertical position of the LD chuck assembly 100, as hereinafter described in detail. A disc-shaped chuck 104 of a synthetic resin is rotatably supported at the underside of the center of rectangular plate 100a so as to be aligned with the turntable 23 of the LD drive mechanism 20. A switch actuating projection 103a depends from the center of flange 103 and is positioned to extend downwardly through the hole 85 in tray carrier 80 for engagement with a detecting switch 108 suitably mounted below chassis 3. Such switch 108 is connected to a microcomputer including a controller (not shown) which is, in turn, connected to a display unit 7 desirably provided on the front panel of the player casing 2. It will be appreciated that, when the chuck assembly 100 is moved downward in response to the downward movement of tray carrier 70 and 80 and of the tray 10 thereon, projection 103a actuates the switch 108 which thereby detects that an LD has been properly clamped between the turntable 23 of the LD drive mechanism 24 and the chuck 104 of assembly 100. However, if for any reason the downward movement of tray 10 for depositing an LD on the turntable 23 is not accompanied by the normal downward movement of plate 100a of chuck assembly 100, then projection 103a does not actuate switch 108 and it is thereby indicated that normal chucking of the LD has not been achieved. Typically, upon the receipt by the microcomputer of the information that normal chucking has not been achieved, the display unit 7 provides an indication thereof and the operation of the LD drive mechanism 20 is aborted.

As shown on FIGS. 6 and 9, the CD chuck assembly 110 includes an elongated cantilevered metal plate 110a having a semi-circular end portion with a circular chuck 111, which may be constituted by a disc-shaped magnet, rotatably supported at the underside thereof. A pair of spaced apart support rods 112 and 113 project vertically downward from the end of plate 110a remote from chuck 111 and are slidably received in the cylindrical bosses 84b and 84c of tray carrier 80 so as to permit vertical movements of plate 110a relative to carrier 80. When a CD is being reproduced, the end edge of plate 110a adjacent carrier 80 rests on the adjustment lever 88 which thereby determines the vertical position of the chuck 111. On the otherhand, when an LD is being reproduced, the drive positioning mechanism 40 disposes CD drive mechanism 30 in its inoperative or stowed position shown in full lines on FIG. 10, and in which at least one of the support rods 112 and 113 has been engaged and pushed upwardly, at its lower end, by the inclined surface 32c of block 32 for maintaining plate 110a of the CD chuck assembly 110 in a raised or inoperative position for avoiding interference thereof with the LD.

In order to horizontally stabilize plate 110a of the CD chuck assembly 110 in the operation or lowered position thereof, an inverted L-shaped projection 114 extends from the free end portion of such plate and is engageable in a recess 101a formed in flange 101 of the LD chuck assembly 100.

Referring now to FIGS. 4 and 6, it will be seen that the carrier driving mechanism 120 for effecting vertical movements of the tray carriers 70 and 80 includes an elongated slide 124 extending parallel to carriers 70 and 80 on chassis 3 and being mounted for longitudinal sliding movement by means of pins 122 and 123 extending from the chassis 3 at spaced apart locations and slidably received in similarly spaced apart elongated slots 124a and 124b, respectively, in slide 124. A cam follower pin 121 depends from an upwardly offset forward end portion of slide 124 for a purpose hereinafter described in detail, and the back end of slide 124 is pivotally connected with one arm of a laterally extending control lever 126 which is pivoted, at its center, on a pin 125 carried by the chassis 3. A spring 129 extends between the pin 123 and a spring anchor 126c formed on lever 126 for urging the latter to pivot about pin 125 in the counter-clockwise direction as viewed on FIG. 4. However, it will be appreciated that longitudinal movement of slide 124 causes corresponding pivotal movement of lever 126 about its central pivot 125, which, spring 129 has the effect of biasing the tray carriers 70 and 80 in the upward direction, as will be hereinafter apparent. The opposite ends of the lever 126 are formed with recesses 126a and 126b receiving coupling pins 127a and 128a, respectively, formed at the lower edges of slide cam plates 127 and 128, disposed against the inner surfaces of side plates 4 and 5, respectively. The slide cam plates 127 and 128 are slidably respectively, and guided for respective horizontal movements by down turned rims 4a and 5a extending along the upper edges of side plates 4 and 5, as shown on FIGS. 3 and 6. It will be apparent the slide cam plates 127 and 128 move horizontally in opposite directions in response to turning of pivoted lever 126.

As shown particularly on FIG. 6, slide cam plate 127 is formed with cam grooves 127b and 127d in its forward and rearward portions, respectively, for slidably receiving the cam follower pins 76 and 77 projecting outwardly from the adjacent tray carrier 70. Each of the elongated cam grooves 127b and 127d is inclined downwardly from its rear end to its forward end so that the associated tray carrier 70 is displaced downwardly relative to chassis 3 in response to rearward movement of the respective slide cam plate 127.

The other slide cam plate 128 similarly has inclined cam grooves 128b and 128d in its forward and rearward portions to slidably receive the cam follower pins 86 and 87 projecting from the adjacent tray carrier 80. However, each of the cam grooves 128b and 128d is inclined downwardly from its forward end to its rearward end so that the tray carrier 80 is moved downwardly relative to the chassis 3 in response to forward movement of slide cam plate 128.

Figure 20:
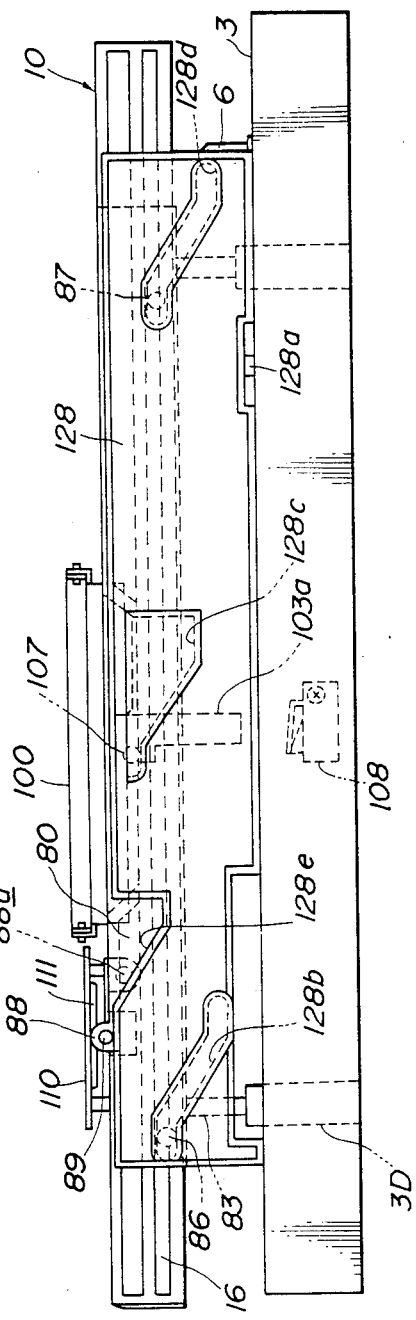
FIG. 20 is a side elevational view of the compatible disc player as viewed in the direction of the arrows XX—XX on FIG. 3, and showing the disc-transporting tray in the same position as on FIG. 19.
Figure 21:
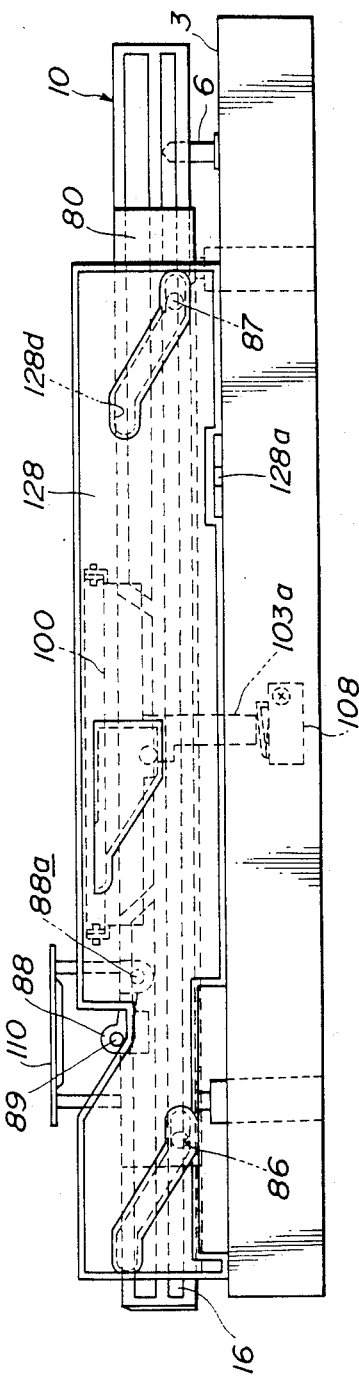
FIG. 21 is a view similar to that of FIG. 20, but showing the disc-transporting tray depressed so as to effect engagement of a disc on such tray with a respective disc drive mechanism.

The slide cam plate 128 is further shown on FIGS. 6, 20 and 21 to be formed with a cam groove 128c in its middle portion for defining a cam surface engageable by the pin 107 extending from the adjacent end of the plate 100a of the LD chuck assembly 100 and being also inclined downwardly from its forward end towards its rear end. Thus, forward movement of the slide cam plate 128 also causes the downward movement of the adjacent end of plate 100a, for example, for engaging the chuck 104 with an LD. The slide cam plate 128 is further shown to have a cam cutout 128e formed in the upper edge portion of plate 128 between cam grooves 128b and 128c and defining a cam surface that is also inclined downwardly in the rearward direction, that is, in the same direction as the cam grooves 128b, 128c and 128d. The inclined surface of cam cutout 128e is engageable by the pin 89 projected through cutout 82b from the pivoted lever 88 on tray carrier 80. Thus, the forward movement of slide cam plate 128, and the resultant movement of pin 89 along cam cutout 128e permits downward pivoting of lever 88 and, by reason of the engagement of the plate 110 therewith, such plate 110a of the CD chuck assembly 110 permits the chuck 111 thereof to move downwardly into engagement with a CD, provided of course that the CD drive mechanism is then in its operative position shown at 30' in broken lines on FIG. 10 so as to avoid any interference with the downward movement of the support rods 112 and 113. The use of cam cutout 128e and lever 88 to control the operative position of the CD chuck 111, while the cam groove 128c for determining the operative position of the LD chuck 104, makes it possible to adjust for different thicknesses of the CD and LD.

Figure 18:
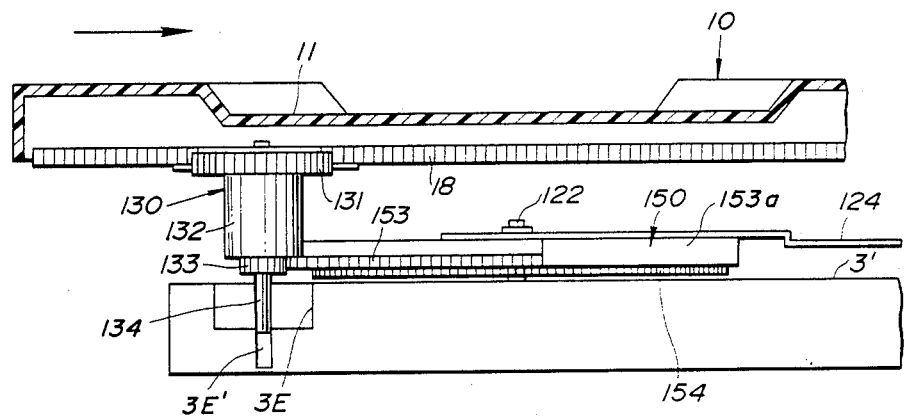
FIG. 18 is a fragmentary sectional view showing a tray driving mechanism of the compatible disc player as viewed in the direction of the arrows XVIII—XVIII on FIG. 4, and with the disc-transporting tray being horizontally moved thereby in the direction into the player casing.
Figure 19:
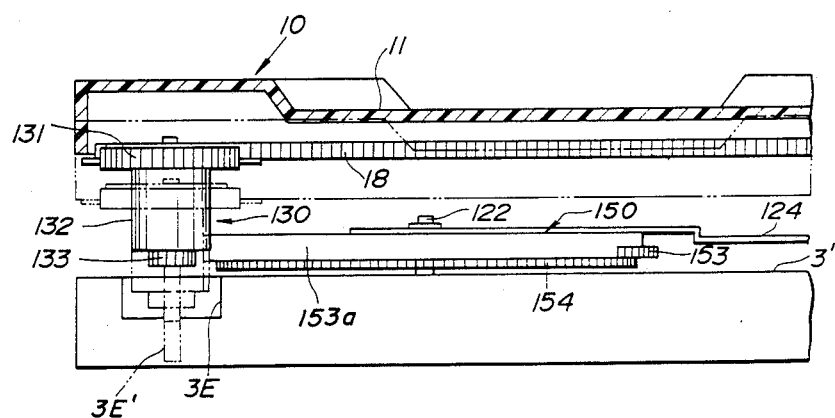
FIG. 19 is a view similar to that of FIG. 18, but with the disc-transporting tray being shown in an operative or playback position so as to be fully contained within a player casing.

As shown on FIGS. 4, 5, 18 and 19, the differential gear member 130 includes a relatively large diameter upper gear 131, an elongated cylindrical body 132 depending from gear 131 and having a concave recess 132a extending along the length of body 132 over a predetermined angular extend thereof, and a relatively small diameter lower gear 133 formed integrally at the lower end of body 132. The differential gear member 130 is rotatably mounted, at its upper end, in the upwardly offset projection 71a extending inwardly from the forward end portion of the bottom flange 71 of the tray carrier 70 and the relatively large diameter gear 131 projects through a slot 71b (FIG. 4) for meshing engagement with the rack 18 of the tray 10 (FIGS. 18 and 19). A shaft 134 depending coaxially from the lower end of differential gear member 130 is slidably received in a bore 3E' at the bottom of a cup-shaped recess 3E in the chassis 3 (FIGS. 18 and 19). Thus, the differential gear member 130 is free to move vertically with tray carrier 70, and the lower portion of the body 132 and the lower gear 133 are accommodated within the cup-shaped recess 3E when the tray carrier 70 is moved downwardly.

Referring now to FIGS. 4 and 9, it will be seen that the skew servo device 140 includes an approximately T-shaped plate 140a which, at its relatively wide stem portion, is pivotally mounted on an axle 142 extending parallel to the edge portion 3b of opening 3A and supported, at its ends, by brackets 141 fixed to the chassis 3. By reason of such pivotal movement of the plate 140a about axle 142, the elongated head portion 140b of such plate is movable upwardly and downwardly relative to the edge portion 3b of the chassis over which the head portion 140b extends. A cam follower pin 143 depends from the stem portion of the plate 140a for engagement with a cam groove of the control cam disc 150, as hereinafter described in detail. An elongated rod 144 extends along head portion 140b latter and is engageable above with the pin 60 extending from the pickup casing 53. Thus, pivoting of plate 140a about axle 142 and the consequent upward and downward movements of rod 144 cause similar movements of pin 60 by which the pickup casing 53 is angularly displaced about the axle 52 so as to correct for any detected skew error, as hereinafter further described.

Figure 7:
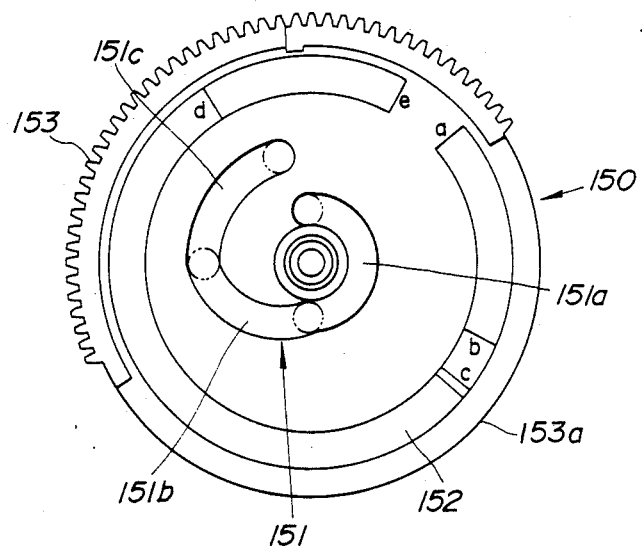
FIG. 7 is a plan view of the control cam disc.
Figure 8:
FIG. 8 is a diagrammatic developed view showing the configuration of a cam groove included in the control cam disc of FIG. 7.
Figure 24:
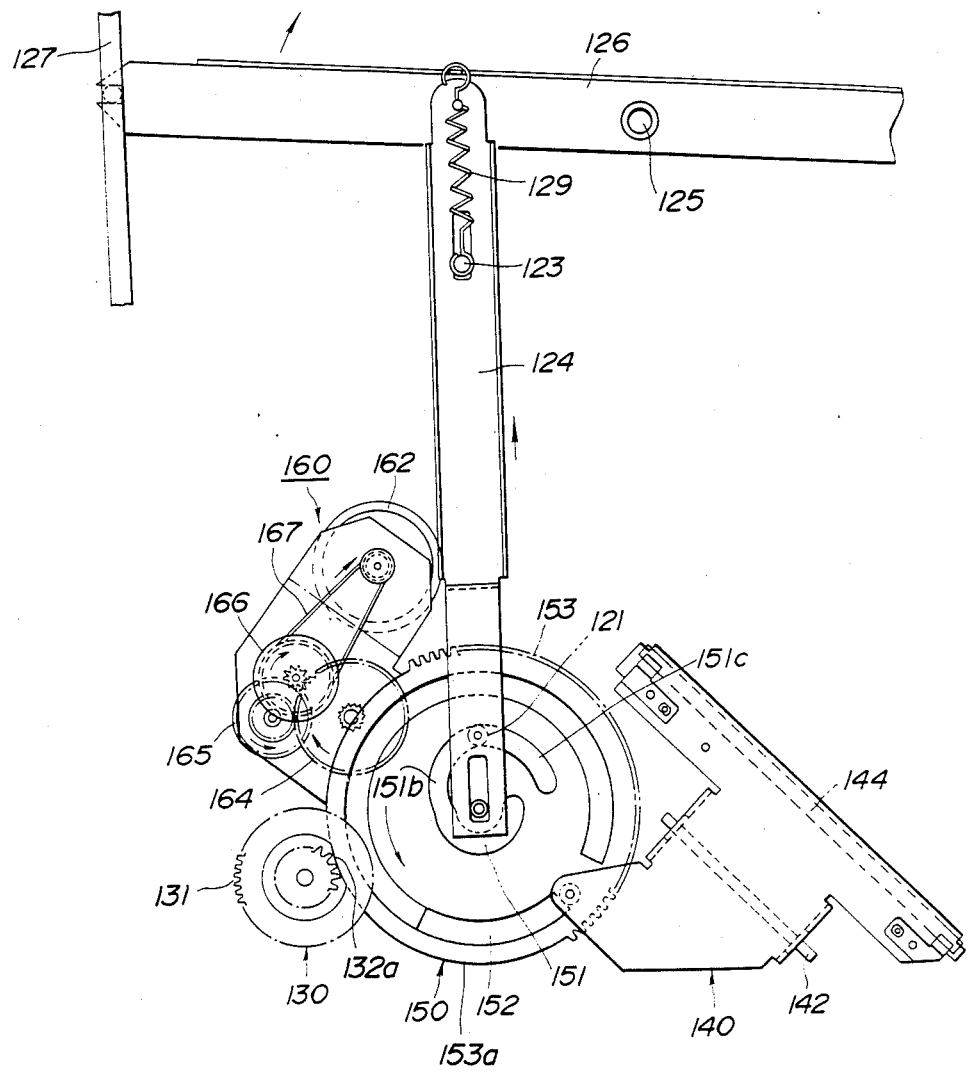
Figure 25:
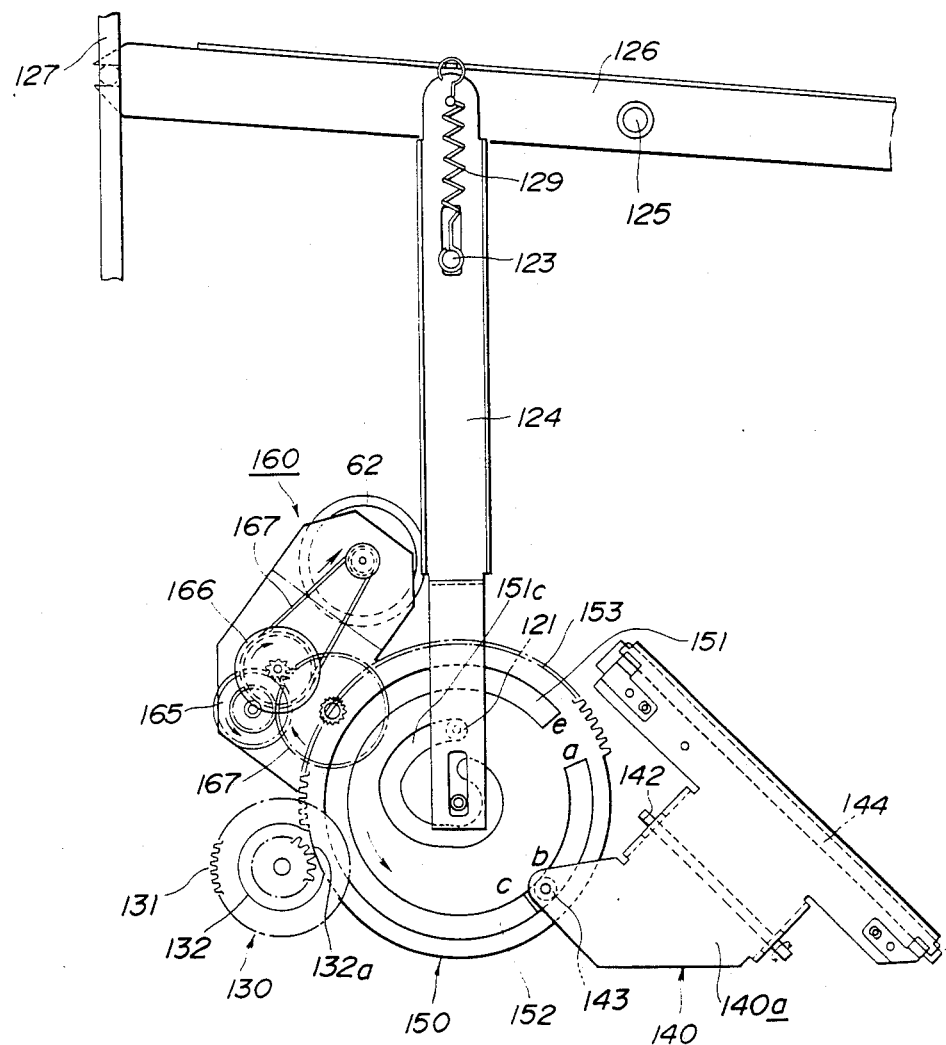

As shown on FIGS. 6, 7 and 8, the control cam disc 150 is mounted, at its center, for rotation about the pin 122 on chassis 3. A first cam groove 151 is formed in the radially inner portion of the upper surface of disc 150 and is engaged by the cam follower pin 121 on slide 124 of the mechanism 120 for driving the tray carriers 70 and 80. A second cam groove 152 is formed in the radially outer portion of the upper surface of disc 150 and is engaged by the cam follower pin 143 of the skew servo device 140. An arcuate upper gear segment 153 is formed on a portion of the outer periphery of the upper part of the control cam disc 150 having an angular extent of about 177°, and the balance of the outer periphery of the control cam disc 150 is smooth, as indicated at 153a on FIG. 7, and is dimensioned to fit into the concave recess 132a of the differential gear member 130, as shown on FIG. 24, when the disc-transporting tray 10 is moved downwardly in its playback position, as shown on FIG. 19. The gear segment 153 is intended to mesh with the small diameter gear 133 at the bottom of the differential gear member 130 for driving the latter, and thereby effecting horizontal movements of the tray 10 when the latter is in its raised position, as shown on FIG. 18. A circular lower gear 154 integral with the control cam disc 150 is provided at the underside of the latter (FIGS. 5, 18 and 19) for the driving of the control cam disc as hereinafter described in detail.

The cam groove 151 is of uniform depth and of varying radial distance from the center of control cam disc 150 so as to effect longitudinal displacments of slide 124 in response to turning of the disc 150. More specifically, the cam groove 151 includes a groove portion 151a (FIG. 7) of approximately 180 degrees angular extent, and which is at a uniform radial distance from the center of disc 150, with such radial distance being predetermined to position slide 124 for maintaining tray carriers 70 and 80 and the disc-transporting tray 10 in the raised position of the latter during horizontal movements of the tray through the opening 2a in the player casing 2. The cam groove 151 is further shown to include a groove portion 151b extending from groove portion 151a over approximately a 90° angular extent of disc 150 and being at a progressively increasing radial distance from the center of disc 150. It will be appreciated that, when disc 150 is turned with cam follower pin 121 engaging cam portion 151b, slide 124 is moved longitudinally either forwardly or rearwardly for displacing slide cam plates 127 and 128 in the directions to cause vertical movements of tray carriers 70 and 80 and of the disc-transporting tray 10 within the player casing 2. Finally, cam groove 151 is shown to include a cam portion 151c extending from cam portion 151b over approximately a 90° angular extent of the disc 150 and being at a substantially uniform radial distance from the center of disc 150 corresponding to the maximum radial distance from groove portion 151b to the center of disc 150. Thus, when cam follower pin 121 is engaged in cam groove portion 151c, slide 124 is positioned to maintain the tray 10 at its lowered or depressed position within player casing 2 and in which an LD or CD transported by the tray 10 is driven by the respective disc drive mechanism 20 or 30 while the angular position of the pickup casing 53 is adjusted by the skew servo device 140 in response to angular displacements of disc 150 in a range which maintains cam follower pin 121 within cam groove portion 151c, as hereinafter further described.

As shown particularly on FIGS. 7 and 8, the circular cam groove 152 is of varying depth so that the engagement of cam follower pin 143 in cam groove 152 causes tilting of plate 140a of the skew servo device 140 about axle 142 in response to turning of control cam disc 150. More particularly, cam groove 152 is shown to have a portion increasing in depth from point a to point b and which is engageable by cam follower pin 143 so that rotational adjustments of disc 150 in one direction or the other will tilt plate 140a and thereby raise or lower the rod 144 acting on pin 60 against the force of spring 61 for changing the angular position of the pickup casing 53. The cam groove 152 is further shown to include a short length from point b to point c of maximum depth followed by a short ramp leading to a cam portion of uniform moderate depth extending over an angular extent of approximately 180° from point c to point d, and which is engaged by cam follower roller pin 143 during the turning of disc 150 for effecting horizontal movements of the tray 10 between its fully extended position (FIG. 15) and its fully retracted position within the player casing (FIG. 19). The depth of the portion of cam 152 between points c and point d is selected to ensure that, when pin 143 is engaged therewith, pickup casing 53 assumes an intermediate angular position for avoiding interference with any other components of the player. The cam groove 152 is completed by a final portion extending upwardly from point d to point e which is at the same level as the cam groove 152 at point a. Cam follower pin 143 engages the portion of cam groove 152 between points d to point e during the downward movement of the disc-transporting tray 10 so that the pickup casing 53 is similtaneously displaced angularly downward against the force of spring 61 for ensuring that their will be no physical contact of the LD or CD with the pickup assembly 50 during the downward movement of the tray at the playback position.

Figure 22:
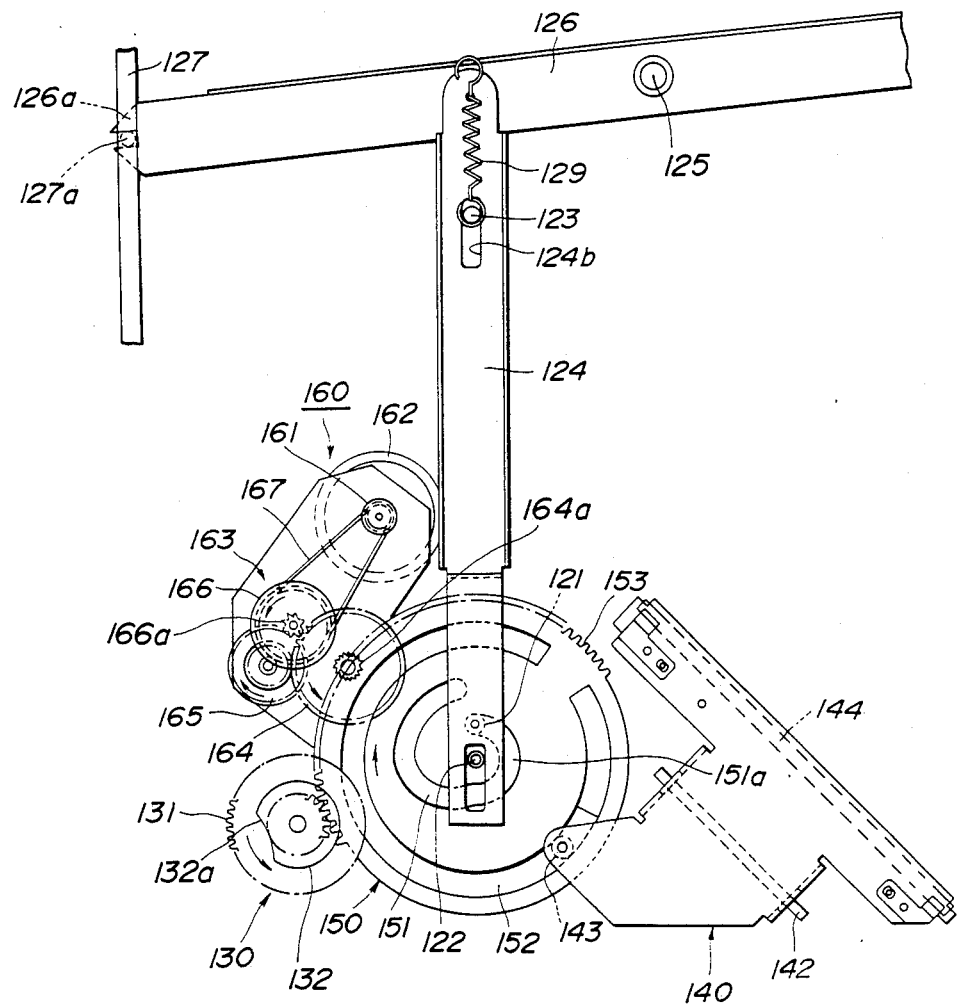
FIGS. 22, 23, 24 and 25 are similar plan views showing the relationships of essential mechanisms of the compatible disc player at various stages of a playback operation thereof, and to which reference will be made in describing such operation of the disc player.

As shown on FIGS. 4 and 22, a drive mechanism 160 for the control cam disc 150 includes a reversible motor 162 fixed on the chassis 3 and having a pulley 161 coupled to its shaft, and a speed reduction gear assembly 163 for transmitting the driving force of motor 162 to control cam disc 150 while effecting a substantial speed reduction. The speed reduction gear assembly 163 is shown to include a first gear 164 having a relatively small diameter pinion 164a integral therewith and continuously meshing with the gear 154 at the underside of the control disc 150, a second gear 165 having a relatively small diameter pinion 165a integral therewith and meshing with the first gear 164, and a pulley 166 integral with a relatively small diameter pinion 166a which meshes with the second gear 165. A belt 167 extends around the driving pulley 161 on the shaft of motor 162 and the pulley 166.

As shown on FIG. 4, a photocensor 170 is disposed in a predetermined position on a bottom plate 3′ located below the opening 3A in chassis 3 for determining whether an LD or a CD is disposed within the recess 11a or the recess 13b, respectively, of the disc-transporting tray 10 when the latter is moved to its playback position within the player casing 2. A lid 171 (FIG. 1) is pivoted at the front of the casing 2 for opening or closing the opening 2a.

The previously mentioned panel at the front of the player casing 2 is further shown on FIG. 1 to have thereon a power supply switch 172, an LD tray open/close button 173, a CD tray open/close button 174, a play/pause button 175, and a stop button 176.

Operation of the compatible disc player 1 in reproducing signals recorded on an LD will now be described with reference to FIGS. 14-25.

Initially, the power supply switch 172 on the front panel of the casing 2 is depressed or turned ON, and then the LD tray open/close button 173 is depressed, with the result that the driving mechanism 160 causes rotation of the control cam disc 150 and the differential gear member 130 in the directions indicated by the arrows on FIG. 22. As a result thereof, tray 10 is moved horizontally in the forward direction through opening 2a to its fully extended position shown on FIGS. 15 and 16 through meshing engagement of the upper gear 131 of rotated differential gear member 130 with the rack 18 on tray 10. With the tray 10 in such fully extended position, an LD 8 is easily inserted in the recess 11a of the LD mounting portion 11 of the tray. The actuation of button 173 further causes drive positioning mechanism 40 to move the CD drive mechanism to its inoperative position shown on FIG. 9.

Figure 23:
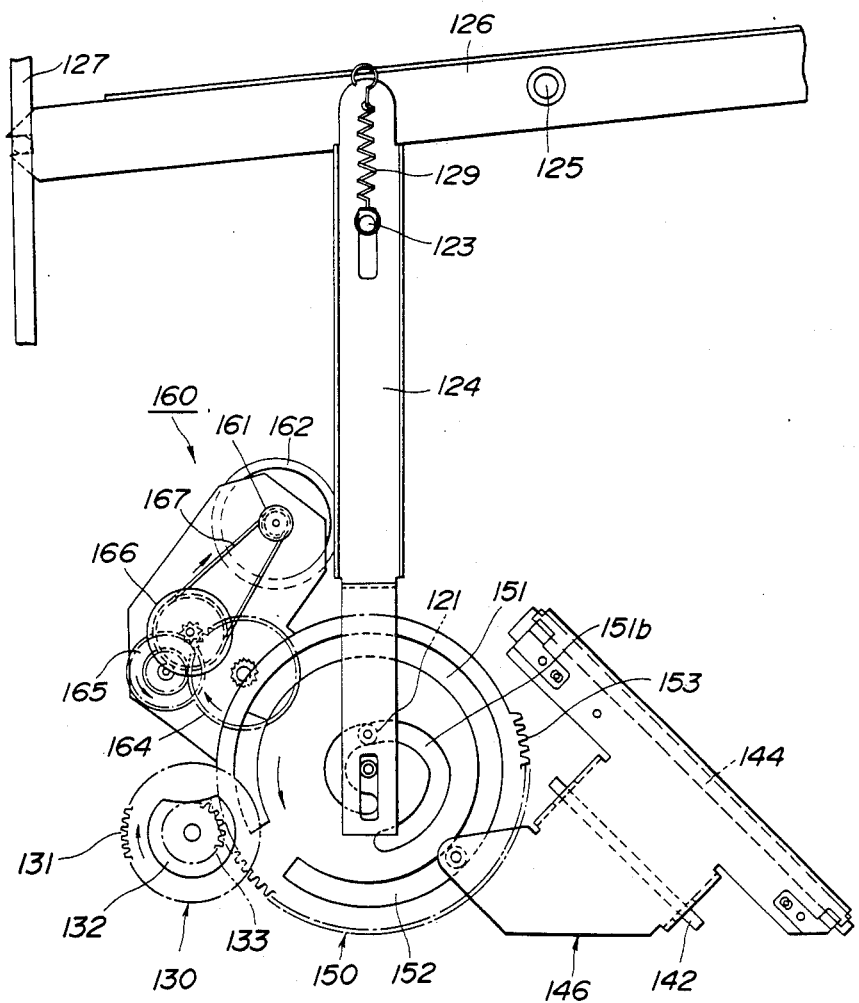

When the button 173 is again depressed with the LD 8 disposed in the disc mounting portion 11 of tray 10, the driving mechanism 160 is operated in the opposite direction so as to cause rotation of control cam disc 150 in the counter-clockwise direction indicated by the arrow on FIG. 23 from the initial position shown on FIG. 22. During such counter-clockwise rotation of disc 150 through about 177°, that is, during a loading interval indicated on FIG. 14, gear segment 153 on disc 150 meshes with gear 133 at the bottom of differential gear member 130 so as to rotate the latter in the direction indicated by the arrow on FIG. 23 and thereby cause gear 131 meshing with rack 18 on tray 10 to cause horizontal movement of the tray fully into the player casing, for example, to the position shown on FIG. 19. It will be appreciated that, during the turning of control cam disc 150 from the position shown on FIG. 22 to the position shown on FIG. 23, cam follower pin 121 engages in cam portion 151a so that slide 124 remains immobile and slide cam plates 127 and 128 retain tray carrier 70 and 80, and hence tray 10, in their raised positions.

As the rotation of control cam disc 150 in the counter-clock wise direction continues beyond the position shown on FIG. 23, gear segment 153 on disc 150 moves out of engagement with gear 133 at the bottom of differential gear member 130 so that continued rotation of disc 150 occurs without corresponding rotation of differential gear member 130. Further, during continued rotation of disc 150 from the position shown on FIG. 23 to the position shown on FIG. 24, cam follower pin 121 is engaged by cam portion 151b, with the result that slide 124 is moved rearwardly and angularly displaces lever 126 in the clockwise direction about pivot pin 125. In response to the foregoing, slide cam plate 127 is moved rearwardly and, conversely, the other slide cam plate 128 is moved forwardly. Thus, tray carriers 70 and 80 and the tray 10 supported thereby are moved downwardly, for example, from the position shown on FIG. 20 to the position shown on FIG. 21. In response to such downward movement of tray 10, the LD 8 mounted on the portion 11 of tray 10 is chucked between the turntable 23 of the LD drive mechanism 20 and the rotatable chuck 104 of the LD chuck assembly 100 which moves downward with the tray carriers 70 and 80. It will be appreciated that, during the downward movement of the tray 10 from the position shown on FIG. 20 to the position shown on FIG. 21, the differential gear member 130 moves downwardly with the tray carrier 70 and its concave recess 132a slidably engages the smooth peripheral surface portion 153a of disc 150 as the latter rotates further. Such engagement of the concave recess 132a with the peripheral surface portion 153a holds differential gear member 130 against rotation and thereby prevents any horizontal displacement of the tray 10 during its downward movement or while it is at its playback position. Since the CD drive mechanism 30 is in its inoperative or stowed position (FIG. 10), upon downward movement of tray carrier 80, one or both of the support rods 112, 113 for the plate 110a of the CD chuck assembly 110 engages the top surface of block 32 to hold CD chuck assembly 110 in a raised position away from the LD 8.

Thereafter, when the play/pause button 175 is depressed, the motor 21 of the LD drive mechanism 20 is rotated at a high speed and the LD 8 chucked between the turntable 23 and the chuck 104 is rotated correspondingly while the optical pickup assembly 50 is moved along guide rod 31 in the radial direction of the LD 8 by means of feed mechanism 63 (FIGS. 4 and 12) for reading or reproducing the information signals recorded on the LD 8.

During such reproducing operation of the player 1, control cam disc 150 is rotationally positioned to engage the inclined portion of the cam groove 152 between the points a and b with the cam follower pin 143 of the tiltable plate 140a of the skew servo device 140. Further, when, during the reproducing operation, the skew detector including the lens 59 (FIG. 9) detects any skew error, for example, as a result of warping of the LD 8, and provides a corresponding error signal, the drive mechanism 160 is suitably operated in response to such error signal for turning disc 150 by small increments in one direction or the other. As a result of such turning of disc 150, the portion a-b of cam groove 152 causes upward or downward movement of cam follower pin 143 engaged therewith for tilting plate 140a and, through the engagement rod 144 with the pin 60 extending from pickup casing 53, for angularly displacing or tilting such pickup casing 53 about axle 52 in the sense to compensate for the detected skew error. In other words, by effecting small turning movements of disc 150 in one direction or the other during a reproducing operation, the pickup casing 53 is angularly displaced for maintaining a desired angular relation of the laser beam in respect to the surface of the disc against which it impinges, with the result that deterioration of the reproduced signal due to cross talk is avoided.

Figure 15:
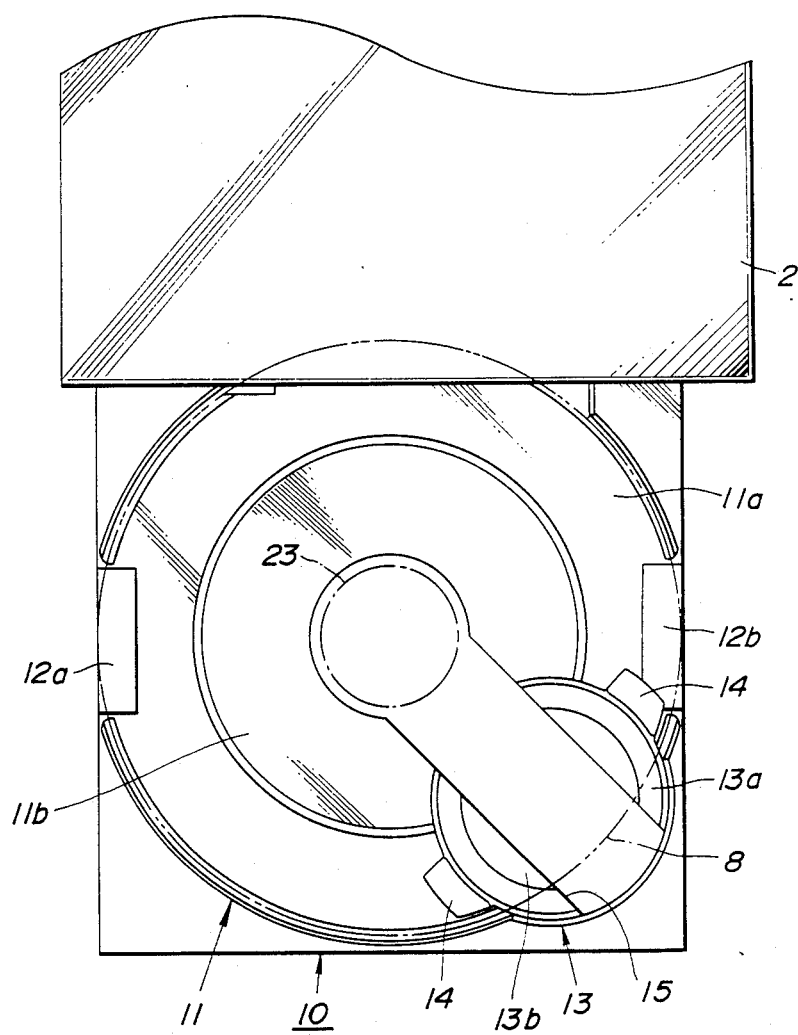
FIG. 15 is a plan view of the compatible disc player embodying the invention, and which is shown with its disc-transporting tray fully extended from the player casing for receiving or ejecting an LD.

When it is desired to halt the reproducing or playback operation, the stop button 176 is depressed for halting the operation of the LD drive mechanism 20, and then the LD tray open/close button 173 is depressed to reverse the previously described operations, that it, to effect the upward movement of the tray 10 from the position shown on FIG. 21 to the position shown on FIG. 20, and then to effect the horizontal movement of the raised tray through the opening 2a at the front of the casing 2 to its fully extended position shown on FIGS. 15 and 16 and at which LD 8 can be conveniently removed from the respective mounting portion 11 of the tray.

The operations of the compatible disc player 1 embodying this invention for playback of a CD 9 are substantially similar to those described above in connection with the playback of the LD 8. However, in the case of reproducing or playback of a CD 9, the CD tray open/close button 174 is depressed after the power supply switch 172 has been turned ON and, as a result thereof, the drive mechanism 160 turns the control cam disc 150 in the clock-wise direction to a rotational position short of that indicated on FIG. 22, for example, to a position corresponding to the 77° marking on FIG. 14 so that the gear 153 on disc 150 and the differential gear member 130 cooperate with the gear rack 18 on the tray 10 for moving the latter forwardly through opening 2a only to an intermediate extended position, as shown on FIG. 17, and at which only the relatively small-diameter or CD mounting portion 13 of the tray 10 is exposed for receiving the CD 9 thereon. Further, as a result of actuation of button 174, the drive positioning mechanism 40 is operated to dispose the CD drive mechanism 30 in its operative position shown in broken lines at 30' on FIG. 10. Thereafter, when the CD tray open/close button 174 is again depressed, tray is initially moved horizontally from the intermediate extended position into casing 2 and then downwardly within the casing to the playback position, as previously described. Since the tray 10 is only pariially extended from the casing 2 for receiving the CD 9, it will be apparent that the time required for the horizontal movemental of the tray to such intermediate extended position, and then from such intermediate extended position back into the casing 2 is substantially shortened, as compared with the times required for such movements when loading or ejecting a large-diameter disc or LD 8.

Figure 10:
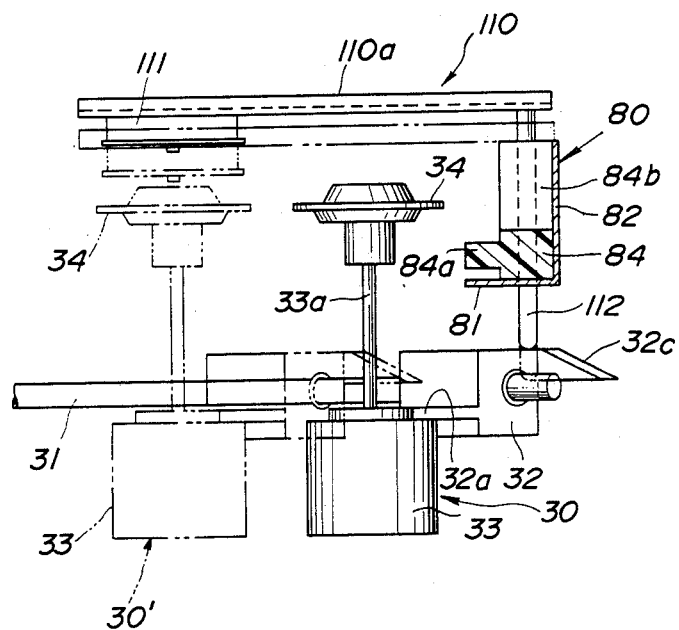
FIG. 10 is a front elevational view of the CD driving mechanism of FIG. 9.

Of course, when the recorded signals on a CD 9 are being reproduced or played back, the downward movement of the tray 10 to the playback position within the casing 2 causes the CD 9 in the mounting portion 13 of the tray to be clamped between the turntable 34 of the CD drive mechanism which is at such time at its operative position indicated in broken lines at 30' on FIG. 10, and the rotary chuck 111 of the CD chuck assembly 110 which moves downwardly with the tray carrier 80, as the block 32 does not block such downward movement of chuck assembly 110 to its operative positions when the CD drive mechanism is in its operative position.

It will be appreciated that, in the compatible disc player 1 embodying this invention, as described above, since the large-diameter disc mounting portion 11 for receiving the LD 8 is substantially centered in respect to the disc-transporting tray 10 and the small-diameter disc mounting portion 13 for receiving the CD 9 is integrally formed on the front part of the tray 10 substantially within the confines of the large-diameter disc mounting portion 11, the construction of the disc-transporting tray 10 can be simplified while its rigidity is substantially improved and the thickness or overall vertical dimension of the tray can be reduced. Further, the size of the disc-transporting tray 10 can be reduced to an extent limited only by the area required for receiving the large diameter LD 8, with the result that a relatively thin and small-sized compatible disc player can be achieved. Furthermore, as already noted, since the disc-transporting tray 10 is not fully extended in the horizontal direction from the casing 2 when a relatively small-diameter disc is to be mounted on or removed from the mounting portion 13 of the tray 10, the loading and ejecting time for the small-diameter disc or CD 9 can be substantially shortened.

Having described in detail a prefered embodiment of the invention with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. An apparatus for reproducing signals recorded on a selected one of first and second discs having relatively larger and smaller diameters, respectively, comprising:
   a housing having an opening at the front thereof;
   tray means mounted for horizontal movement in respect to said housing between a first position within said housing and a second position in which said tray means projects substantially forwardly from said housing through said opening, said tray means having first and second disc mounting portions dimensioned for receiving and holding said first and second discs, respectively, said first disc mounting portions being substantially fully exposed at the outside of said housing in said second position of said trays means for easy access of one of said first discs to and from said first disc mounting portion, and said second disc mounting portion having a center positioned at a front part of said tray means so as to be substantially fully exposed at the outside of said housing at a position of said tray means intermediate said first and second positions for easy access of one of said second discs to and from said second disc mounting portion;
   tray driving means for moving said tray means between said first and second positions thereof;
   disc driving means for rotating a disc in one of said first and second disc mounting portions with said tray means in said first position; and
   playback means for reproducing signals from the rotated disc in said one of the disc mounting portions.

2. The apparatus according to claim 1; wherein said tray driving means is operative to stop said tray means at said position intermediate said first and second positions when one of said second discs is to be received in, or withdrawn from said second disc mounting portion.

3. The apparatus according to claim 1; wherein said first disc mounting portion is substantially centered in the lateral direction in respect to said tray means, and said second disc mounting portion is laterally offset in respect to the center of said tray means.

4. The apparatus according to claim 3; wherein said second disc mounting portion is disposed at the right-hand side of said front part of the tray means as viewed from the front of the latter.

5. The apparatus according to claim 3; wherein said second disc mounting portion is substantially contained within confines of said first disc mounting portion.

6. The apparatus according to claim 3; wherein said disc driving means include first and second motors for selectively direct driving said disc in one of said first and second disc mounting portions, respectively, with said tray means in said first position.

7. The apparatus according to claim 6; wherein each of said first and second disc mounting portions is substantially circular with the center of said second disc mounting portion lying on a diameter of said first disc mounting portion; and wherein said playback means includes optical pickup means for optically reproducing signals from the rotated disc in said one of the first and second disc mounting portions, and sliding means for moving said optical pickup means rectilinearly along said diameter of the first disc mounting portion with said tray means in said first position.

8. The apparatus according to claim 7; wherein said second motor is mounted for sliding movement parallel with said optical pickup means along said diameter between an operative position concentric with said second disc mounting portion with said tray means in said first postion and a stowed position outside the range of said first disc mounting portion with said tray means in said first position; and further comprising means for displacing said second motor to said stowed position during reproducing of signals from one of said discs in said first disc mounting portion.

9. The apparatus according to claim 8; further comprising means for precisely locating said second motor in said operative position during reproducing signals from one of said second discs in said second disc mounting portion.

10. An apparatus for reproducing signals recorded on a selected one of first and second discs having relatively larger and smmaler diameters, respectively, comprising:
   tray means having first and second disc mounting portions dimensioned for receiving and holding said first and second discs, respectively;
   tray driving means for moving said tray means between a first position, at which signals recorded on either of said first and second discs can be reproduced, and a second position, at which one of said first discs can be inserted in, and withdrawn from said first disc mounting portion;
   said first disc mounting portion being substantially completely within a loading space when said tray means is in said second position for the insertion or withdrawal of one of said first discs into or from said first disc mounting portions and said second disc mounting portion being within said loading space for the insertion or removal of one of said second discs when said tray means is in an intermediate position between said first and second positions; and
   means for controlling said tray driving means so as to move said tray means only to said intermediate position for the insertion of one said second discs so as to relatively minimize the time required for said tray means to receive one of said second discs at said intermediate position and then to be moved by said tray driving means to said first position.

11. The apparatus according to claim 10; wherein said second disc mounting portion has a center which is displaced from the center of said first disc mounting portion in the direction of said movement of the tray means from said first position to said second position.

12. An apparatus for reproducing signals recorded on a selected one of first and second discs having relatively larger and smaller diameters, respectively, comprising;
   tray means having first and second disc mounting portions dimensioned for receiving and holding said first and second discs, respectiely;
   tray driving means for moving said tray means between a first postion, at which signals recorded on either of said first and second discs can be reproduced, and a second position, at which one of said first discs can be inserted in, and withdrawn from said first disc mounting portion;
   said second disc mounting portion having a center which is displaced from the center of said first disc mounting portion in the direction of said movement of the tray means from said first position to said second position; and
   said first disc mounting portion being completely within a loading space when said tray means is in said second position for the insertion or withdrawal of one of said first discs into or from said first disc mounting portion; and
   means for controlling said tray driving means so as to move said tray means to a position intermediate said first and second positions and at which said second disc mounting portion is within said loading space for the insertion or removal of one of said second discs, thereby minimizing the time required for said tray means to receive one of said second discs at said intermediate position and then to be moved by said tray driving means to said first position.

13. The apparatus according to claim 12 wherein said first disc mounting portion is substantially centered in the lateral direction in respect to said tray means, and said second disc mounting portion is laterally offset in respect to the center of said tray means.

14. The apparatus according to claim 13; wherein said second disc mounting portion is at least in part contained within confines of said first disc mounting portion.

15. The apparatus according to claim 14; further comprising a casing having an opening at the front thereof through which said tray means is movable horizontally between said first position within said casing and said second position projecting forwardly from said casing;
   first and second disc drive means disposed within said casing and being selectively operable to rotate one of said first and second discs received by the respective one of said disc mounting portions of said tray means in said first position;
   optical pickup means disposed in said casing between said first and second disc drive means for reading signals recorded on said one of the first and second discs;
   on elongated cut-out in said tray means extending from the center of said first disc mounting portion through the center of said second disc mounting portion; and
   means for moving said optical pickup means and said second disc drive means in paths that extend along said elongated cut-out of said tray means when the latter is in said first position.

16. The apparatus according to claim 12; wherein said first disc is a video disc and said second disc is a compact disc.

17. An apparatus for reproducing signals recorded on a selected one of first and second discs having relatively larger and smaller diameters, respectively, comprising:
   tray means having first and second disc mounting portions dimensioned of receiving and holding said first and second discs, respectively, said first disc mounting portion being substantially centered in the lateral direction in respect to said tray means, and said second disc mounting portion being laterally offset in respect to the center of said tray means and at least in part contained within confines of said first disc mounting portion;
   a casing having an opening at the front thereof through which said tray means is movable horizontally between a position within said casing and a second position projecting forwardly from said casing;
   said second disc mounting portion having a center which is displaced from the center of said first disc mounting portion in the direction of said movement of the tray means from said first position to said second position;
   tray driving means for moving said tray means between said first position, at which signals recorded on either of said first and second discs can be reproduced, and said second position, at which one of said first and second discs can be inserted in, and withdrawn from a respective one of said find second disc mounting portions;

first and second disc drive means disposed within said casing and being selectively operable to rotate one of said first and second discs received by the respective one of said disc mounting portions of said tray means in said first position;

optical pickup means disposed in said casing between said first and second disc drive means for reading signals recorded on said one of the first and second discs;

an elongated cut-out in said tray means extending from the center of said first disc mounting portion through the center of said second disc mounting portion;

means for moving said optical pickup means and said second disc drive means in paths that extend along said elongated cut-out of said tray means when the latter is in said first position;

a pair of tray carriers disposed within said casing at opposite sides of the latter and supporting said tray means therebetween for horizontal movements relative to said carriers;

means mounting said tray carriers for vertical movement relative to said casing between a raised level at which said tray means is movable through said opening and a lowered level at which said selected one of the discs received in said respective disc mounting portion of said tray means at said first position is engageable from below by the respective one of said first and second disc drive means;

first and second chuck means mounted for vertical movements with said tray carriers and being engageable from above with said selected one of the discs when said tray carriers are at said lowered level for holding said selected one of the discs in engagement with said respective one of the first and second disc drive means;

carrier driving means engaged with said tray carriers for effecting said vertical movements of the latter;

differential gear means engageable with said tray means for effecting said horizontal movements of the latter in respect to said tray carriers;

servo means engaeable with said optical pickup means for correcting a skew angle of the latter and thereby compensating for warping of said selected one of the discs; and a rotary control member mounted in said casing between said tray carriers for effecting the interlocking control of said diferential gear means, said carrier driving means and said servo means.

18. The apparatus according to claim 17; wherein said first disc drive means for rotating one of said first discs of relatively larger diameter includes a motor mounted at the bottom of said casing and having a shaft concentric with said first disc mounting portion of said tray means when the latter is in said first position, and a turntable on said shaft of the motor.

19. The apparatus according to claim 17; wherein said second disc drive means includes a guide rod fixed at the bottom of said casing and extending parallel with said elongated cut-out, a support block slidable along said guide rod, a motor mounted on said support block and having an upstanding shaft substantially centered in respect to the width of said cut-out, and a turntable fixed on said shaft.

20. The apparatus according to claim 17; wherein said second disc drive means is moved along the respective one of said paths between an operative position relatively close to said first disc drive means and centered in respect to said second disc mounting portion of said tray means with the latter in said first position thereof, and an inoperative position of said second disc drive means further removed from said first disc drive means in a direction toward one of said tray carriers so as to be outside of the range of said first disc mounting portion in said first position of the tray means; and wherein said second chuck means includes mounting means therefor extending slidably through said one tray carrier from above; and further comprising means on said second disc drive means engageable from above by said mounting means of the second chuck means for preventing downward movement of the latter with said tray carriers when said second disc drive means is in said inoperative position, whereby to prevent interference of said second chuck means with one of said first discs in said first disc mounting portion of the tray means.

21. The apparatus according to claim 17; wherein said carrier driving means includes a slide member mounted at the bottom of said casing for rectilinear movements in the forward and rearward directions of the latter, a control lever pivoted between its ends at said bottom of the casing and connected to said slide member so as to be angularly displaced in response to said rectilinear movements, slide cam plates mounted for slidable movements in said forward and rearward directions at the opposite sides of said casing and being connected to adjacent ends of said control lever to effect said slidable movements in response to angular displacements of the control lever, cooperatively engageable cam surfaces and cam followers on said slide cam plates and said tray carriers, respectively, to effect said vertical movements of the tray carriers in response to said slidable movements of the slide cam plates, means on said slide member engageable with said rotary control member for effecting said rectilinear movements of said slide member in response to turning of said rotary control member, and spring means connected to said control lever for biasing the latter in the direction corresponding to upward vertical movements of said tray carriers.

22. The apparatus according to claim 17; wherein said rotary control member has first and second cams thereon for controlling said carrier driving means and said servo means, respectively, and a gear segment for driving said differential gear means.

23. The apparatus according to claim 17; further comprising means for detecting failure of one of said first and second chuck means to properly engage said selected one of the discs when said tray carriers are moved to said lowered level.

24. An apparatus for reproducing signals recorded on a selected one of first and second discs having relatively larger and smaller diameters, respectively, comprising:

tray means having first and second disc mounting portions dimensioned for receiving and holding said first and second discs, respectively, said first disc mounting portion being substantially centered in the lateral direction in respect to said tray means, and said second disc mounting portion being laterally offset in respect to the center of said tray means and at least in apart contained within confines of said first disc mounting portion;

a casing having an opening at the front thereof through which said tray means is movable horizontally between a first position within said casing and a second position projecting forwardly from said casing;

said second disc mounting portion having a center which is displaced from the center of said first disc mounting portion in the direction of said movement of the tray means from said first position to said second position;

tray driving means for moving said tray means between said first position, at which signals recorded on either of said first and second discs can be reproduced, and said second position, at which one of said first and second discs can be inserted in, and withdrawn from a respective one of said first and second disc mounting portions;

first and second disc drive means disposed within said casing and being selectively operable to rotate one of said first and second discs received by the respective one of said disc mounting portions of said tray means in said first position, said second disc drive means including a guide rod fixed at the bottom of said casing and extending parallel with said elongated cut-out, a support block slidable along said guide rod, a motor mounted on said support block and having an upstanding shaft substantially centered in respect to the width of said cut-out, and a turntable fixed on said shaft;

optical pickup means disposed in said casing between said first and second disc drive means for reading signals recorded on said one of the first and second discs;

an elongated cut-out in said tray means extending from the center of said first disc mounting portion through the center of said second disc mounting portion; and means for moving said optical pickup means and said second disc drive means in paths that extend along said elongated cut-out of said tray means when the latter is in said first position, said means for moving the second disc drive means including a gear rack member, means mounting said gear rack member for sliding parallel to said guide rod, a motor for driving said gear rack member through speed reducing gear means, elastic means connecting said support block to said gear rack member for urging said support block to move with said gear rack member in a direction toward an operative position of said second disc drive means, and means for defining said operative position of the second disc drive means.

25. The apparatus according to claim 24; wherein said means for moving said optical pickup means includes a second support block for the optical pickup means slidable along said guide rod, a gear rack on said second support block, and feed means including a second motor and speed reducing gear means for driving said gear rack on the second support block from said second motor.

* * * * *